United States Patent
Fang et al.

(10) Patent No.: US 12,244,659 B2
(45) Date of Patent: Mar. 4, 2025

(54) MULTIMEDIA CLOUD SERVICE METHOD, COMMUNICATION CLOUD SYSTEM AND COMPUTER READABLE STORAGE MEDIUM

(71) Applicant: ZTE CORPORATION, Shenzhen (CN)

(72) Inventors: Yanwei Fang, Shenzhen (CN); Lu Zhang, Shenzhen (CN); Liping Li, Shenzhen (CN); Mengxiao Wang, Shenzhen (CN); Shilin Chen, Shenzhen (CN); Wei Lu, Shenzhen (CN); Tingxiang Shi, Shenzhen (CN); Hongbing Pan, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 0 days.

(21) Appl. No.: 18/563,452

(22) PCT Filed: Apr. 15, 2022

(86) PCT No.: PCT/CN2022/087152
§ 371 (c)(1),
(2) Date: Nov. 22, 2023

(87) PCT Pub. No.: WO2022/247518
PCT Pub. Date: Dec. 1, 2022

(65) Prior Publication Data
US 2024/0236166 A1    Jul. 11, 2024

(30) Foreign Application Priority Data
May 26, 2021 (CN) .......................... 202110578428.4

(51) Int. Cl.
*H04L 65/65* (2022.01)
*H04L 67/10* (2022.01)

(52) U.S. Cl.
CPC .............. *H04L 65/65* (2022.05); *H04L 67/10* (2013.01)

(58) Field of Classification Search
None
See application file for complete search history.

(56) References Cited

U.S. PATENT DOCUMENTS

| | | | |
|---|---|---|---|
| 8,108,526 B2 * | 1/2012 | Yan ........................ | H04L 67/141 709/227 |
| 9,544,208 B2 * | 1/2017 | Scholz .................... | H04L 43/08 |

(Continued)

FOREIGN PATENT DOCUMENTS

| | | |
|---|---|---|
| CN | 103975566 A | 8/2014 |
| CN | 110290140 A | 9/2019 |
| WO | 2019237363 A1 | 12/2019 |

OTHER PUBLICATIONS

European Patent Office. Extended European Search Report for EP Application No. 22810251.3, mailed Aug. 6, 2024, pp. 1-10.

(Continued)

*Primary Examiner* — Quang N Nguyen
(74) *Attorney, Agent, or Firm* — Vivacqua Crane, PLLC

(57) ABSTRACT

A multimedia cloud service method, a communication cloud system and a computer readable storage medium are disclosed. The method may include, receiving, by the signaling cloud system, a media service request; controlling, according to the media service request, by the signaling cloud system, the media control entity to process the media service rule; and establishing, according to the media service rule, by the media control entity, a media data interaction path between the terminal device and the media exchange entity.

16 Claims, 10 Drawing Sheets

(56) References Cited

U.S. PATENT DOCUMENTS

| | | | |
|---|---|---|---|
| 2007/0097999 A1* | 5/2007 | Yan | H04L 61/2514 |
| | | | 370/522 |
| 2008/0307108 A1* | 12/2008 | Yan | H04L 67/306 |
| | | | 380/278 |
| 2013/0163446 A1* | 6/2013 | Kruger | H04L 43/12 |
| | | | 370/252 |
| 2015/0043453 A1 | 2/2015 | Hegarty et al. | |
| 2017/0026422 A1 | 1/2017 | Klein et al. | |
| 2020/0213221 A1 | 7/2020 | Sharma et al. | |
| 2021/0409460 A1 | 12/2021 | Yang et al. | |

OTHER PUBLICATIONS

International Searching Authority. International Search Report and Written Opinion for PCT Application No. PCT/CN2022/087152 and English translation, mailed Jul. 11, 2022, pp. 1-10.

* cited by examiner

MULTIMEDIA CLOUD SERVICE METHOD, COMMUNICATION CLOUD SYSTEM AND COMPUTER READABLE STORAGE MEDIUM

CROSS-REFERENCE TO RELATED APPLICATION

This application is a national stage filing under 35 U.S.C. § 371 of international application number PCT/CN2022/087152, filed Apr. 15, 2022, which claims priority to Chinese patent application No. 202110578428.4 filed May 26, 2021. The contents of these applications are incorporated herein by reference in their entirety.

TECHNICAL FIELD

The present disclosure relates to the technical field of multimedia communication, and in particular to a method for multimedia cloud service, a communication cloud system, a signaling cloud system, a media cloud system, an operation and control device, and a computer-readable storage medium.

BACKGROUND

The evolution of communication technology has reached the fifth generation. The first generation to the fourth generation of mobile communication technology, focus on communication between people, while the emergence of the fifth generation of communication technology provides users with higher bandwidth, lower latency, and wider coverage of mobile networks, which can provide more applications such as network live streaming, virtual reality, and 4K resolution videos.

5G technology will be geared towards five key future application scenarios including: 1) ultra-high speed scenarios, providing extremely fast data network access for future mobile broadband users; 2) support for high-density crowds, providing a high-quality mobile broadband experience in areas or occasions with high crowd density; 3) the best possible experience at any time, anywhere, ensuring that users still enjoy high-quality services while on the move; 4) ultra-reliable real-time connectivity, ensuring that new applications and user instances meet stringent standards for latency and reliability; and 5) ubiquitous IOT communication, ensuring efficient handling of communications for a diverse and large number of devices, including machine-type devices and sensors, or the like. The above application scenarios put forward higher requirements for the communication system in 5G networks.

Internet Protocol Multimedia Subsystem (IMS) is a subsystem proposed by the 3rd generation partnership project (3GPP) to support IP multimedia services, which is the direction along which multimedia communication develops. As an application subsystem in the 4G era, IMS can well meet the communication between people in the 4G era. IMS is notably characterized by the Session Initial Protocol (SIP) system adopted, and the communication has nothing to do with the access mode, and it has many abilities of the multimedia service such as separation of control function and bearing capacity, separation of call and session, separation of application and service, separation of service and network, and integration of mobile network and Internet service. The existing IMS architecture has the following shortcomings: distributed media resources, and repetitive construction of network media resources, thus resulting in resource waste. In addition, the media data interaction path is long, and end-to-end media data needs to pass through multiple media functional entities, which is not conducive to low-latency applications.

SUMMARY

Some embodiments of the present disclosure provide a method for multimedia cloud service, a communication cloud system, a signaling cloud system, a media cloud system, an operation and control device, and a computer-readable storage medium, in order to at least alleviate the related problems in the related art.

According to an aspect of the present disclosure, an embodiment provides a method for multimedia cloud service applied to a communication cloud system, the communication cloud system may include a signaling cloud system and a media cloud system, and the media cloud system may include a media service entity configured to process media data, a media exchange entity configured to send the media data to a terminal device or to the media service entity, and a media control entity configured to manage a media service resource of the media service entity and to manage a media service rule; where the method may include, receiving, by the signaling cloud system, a media service request; controlling, according to the media service request, by the signaling cloud system, the media control entity to process the media service rule; and establishing, according to the media service rule, by the media control entity, a media data interaction path between the terminal device and the media exchange entity.

According to another aspect of the present disclosure, an embodiment provides a method for multimedia cloud service applied to a signaling cloud system in a communication cloud system, the communication cloud system may further include a media cloud system, the media cloud system may include a media service entity configured to process media data, a media exchange entity configured to send the media data to a terminal device or to the media service entity, and a media control entity configured to manage a media service resource of the media service entity and to manage a media service rule; where the method may include, receiving a media service request; and controlling, according to the media service request, a media control entity to process a media service rule, to cause the media control entity to establish a media data interaction path between a terminal device and a media exchange entity according to the media service rule.

According to yet another aspect of the present disclosure, an embodiment provides a method for multimedia cloud service applied to a media cloud system in a communication cloud system, the communication cloud system may further include a signaling cloud system, the media cloud system may include a media service entity configured to process media data, a media exchange entity configured to send the media data to a terminal device or to the media service entity, and a media control entity configured to manage a media service resource of the media service entity and to manage a media service rule; where the method may include, processing, by the media control entity, the media service rule according to the media service request from the signaling cloud system, and establishing, by the media control entity, a media data interaction path between a terminal device and the media exchange entity according to the media service rule.

According to yet another aspect of the present disclosure, an embodiment provides a communication cloud system, which may include a media cloud system and a signaling cloud system; where the media cloud system may include a media service entity, a media exchange entity, and a media control entity; the media service entity is configured to process media data to provide media service; the media exchange entity is configured to send the media data to a terminal device or to the media service entity to exchange the media data; the media control entity is configured to manage a media service resource of the media service entity and manage a media service rule; and the signaling cloud system is configured to receive a media service request, and to control, according to the media service request, the media control entity to process a media service rule, to cause the media control entity establishes a media data interaction path between a terminal device and the media exchange entity according to the media service rule.

According to yet another aspect of the present disclosure, an embodiment provides a signaling cloud system, where the signaling cloud system is connected with a terminal device and a media cloud system respectively, the media cloud system may include a media service entity configured to process media data, a media exchange entity configured to send media data to the terminal device or to the media service entity, and a media control entity configured to manage media service resources of the media service entity and to manage the media service rules; and the signaling cloud system is configured to receive a media service request; and the signaling cloud system is further configured to control, according to the media service request, a media control entity to process a media service rule, to cause the media control entity to establish a media data interaction path between a terminal device and a media exchange entity according to the media service rule.

According to yet another aspect of the present disclosure, an embodiment provides a media cloud system, where the media cloud system is connected with a signaling cloud system, and the media cloud system may include a media service entity configured to process media data, a media exchange entity configured to send media data to the terminal device or to the media service entity, and a media control entity configured to manage media service resources of the media service entity and to manage the media service rules; and the media control entity is further configured to process the media service rule according to the media service request from the signaling cloud system, and establish a media data interaction path between a terminal device and the media exchange entity according to the media service rule.

According to yet another aspect of the present disclosure, an embodiment provides an operation and control device that may include at least one processor and a memory configured to be communicatively connected with the at least one processor; where the memory stores an instruction executable by the at least one processor which, when executed by the at least one processor, causes the at least one processor to carry out any one of the methods as described above.

According to yet another aspect of the present disclosure, an embodiment provides a computer-readable storage medium storing a computer-executable instruction which, when executed by a processor, causes the processor to carry out any one of the methods as described above.

Other features and advantages of the present disclosure will be illustrated in the following description, and in part will be apparent from the description, or may be understood by practicing the present disclosure. The objects and other advantages of the present disclosure can be achieved and obtained by the structure particularly set forth in the description, claims and drawings.

BRIEF DESCRIPTION OF DRAWINGS

The drawings are intended to provide a further understanding of the technical scheme of the present disclosure, and constitute a part of the specification, and they are intended to illustrate the technical scheme of the present disclosure in conjunction with the embodiments of the present disclosure, but are not intended to limit the technical scheme of the present disclosure.

Some embodiments of the present disclosure will be further illustrated with reference to the drawings.

DETAILED DESCRIPTION

Figure 1:
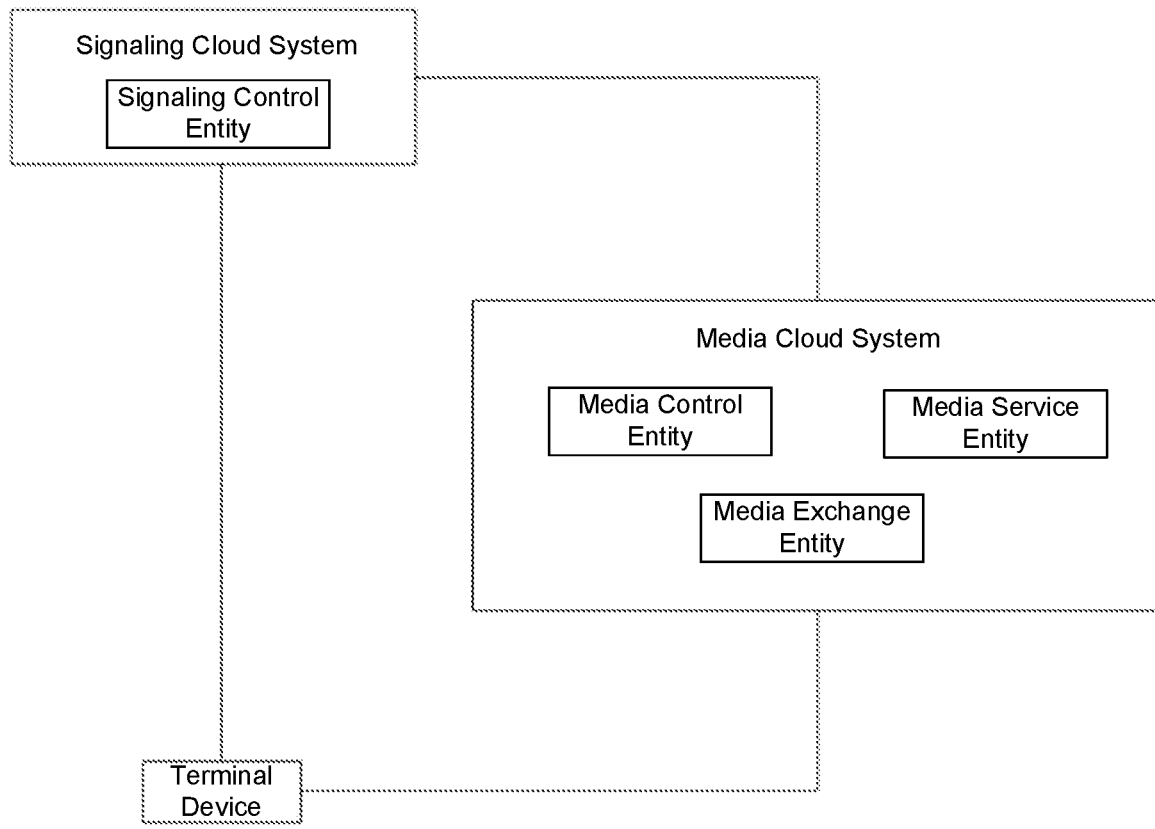
FIG. 1 depicts a schematic diagram showing a communication cloud system according to an embodiment of the present disclosure.

This section will describe the several embodiments of the present disclosure. Various embodiments of the present disclosure are shown in the drawings. The drawings are intended to illustrate to the description with graphics, so that the readers can intuitively and vividly understand each technical feature and the overall technical scheme of the present disclosure. The drawings, however, shall not be interpreted as limitations to the scope of the present disclosure.

It shall be understood that, in the description of an embodiment of the present disclosure, terms "first" and "second" if described, are intended for distinguishing technical features, which shall not be understood as indicating or implying relative importance or implicitly indicating the number of the indicated technical features or the order of the indicated technical features.

In the description of various embodiments of the present disclosure, the terms such as provide, mount or connect should be broadly understood, unless otherwise specified, and those having ordinary skills in the art can reasonably determine the specific meanings of the above terms in various embodiments of the present disclosure in conjunction with the specific contents of the technical scheme.

Internet Protocol Multimedia Subsystem (IMS) is a subsystem proposed by 3rd generation partnership project (3GPP) to support IP multimedia services, which is the direction along which multimedia communication develops. As an application subsystem in the 4G era, IMS can well meet the communication between people in the 4G era. IMS is notably characterized by the Session Initial Protocol (SIP) system adopted, and the communication has nothing to do with the access mode, and it has many abilities such as separation of control function and bearing capacity, separation of call and session, separation of application and service, separation of service and network, and integration of mobile network and Internet service of the multimedia service.

Figure 11:
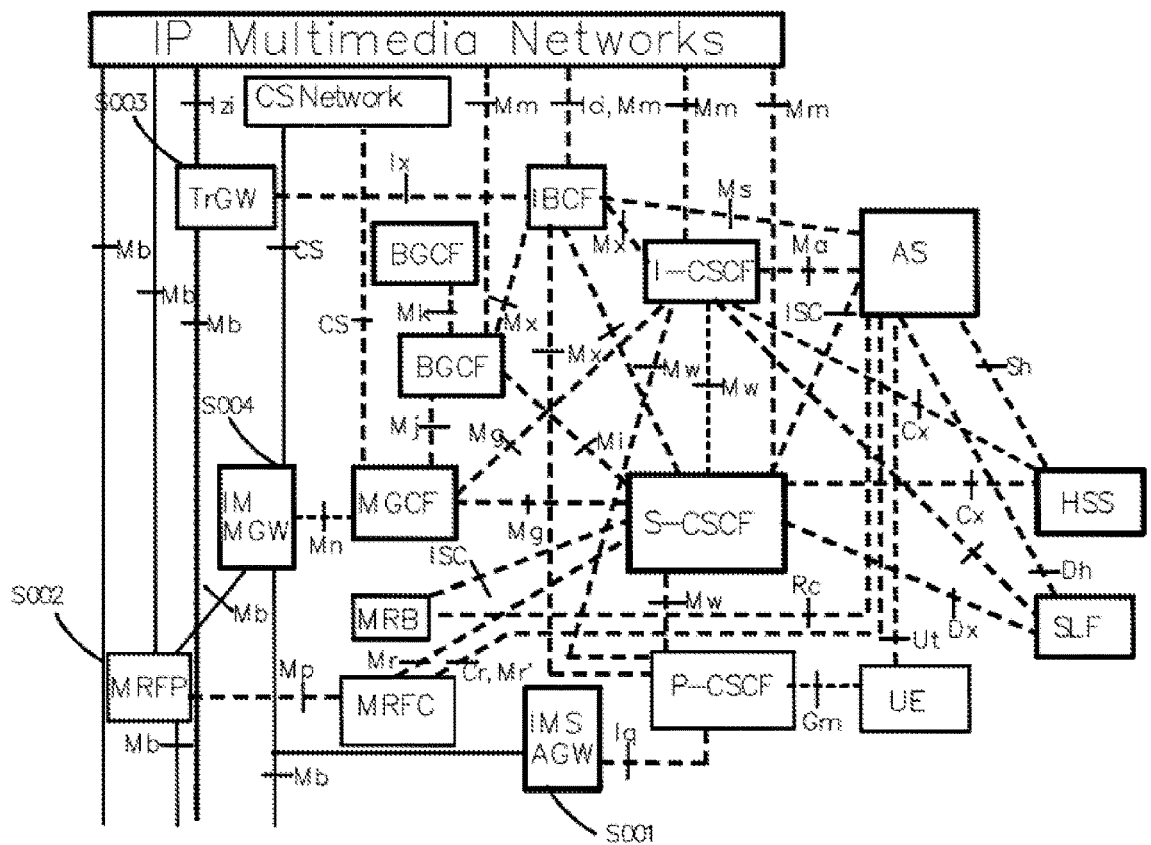
FIG. 11 depicts a schematic diagram showing media components in the existing IMS system.

FIG. 11 depicts a schematic diagram showing media components in an existing IMS system.

S001: Access Gateway (AGW) which realizes media access of IP terminal devices.

S002: Multimedia Resource Function Processor (MRFP), which realizes media functions such as transcoding, announcement, and pressed number detection.

S003: Transition Gateway (TrGW), which realizes media interconnection and transition between networks.

S004: IP Multimedia Media Gateway (IM-MGW), which realizes interconnection with traditional circuit domain networks.

The existing IMS architecture has the following shortcomings: distributed media resources, and repetitive construction of network media resources, thus resulting in resource waste. In addition, the media data interaction path is long, and end-to-end media data needs to pass through multiple media functional entities, which is not conducive to low-latency applications.

In view of this, some embodiments of the present disclosure provide a method for multimedia cloud service, a communication cloud system, a signaling cloud system, a media cloud system, an operation and control device, and a computer-readable storage medium, which can improve the utilization rate of media resources and the expansion ability of media services, the establishment of the media data interaction paths can be controlled, and the interaction delay of media data between both communication parties is reduced.

Some embodiments of the present disclosure will be further illustrated with reference to the drawings.

Figure 2:
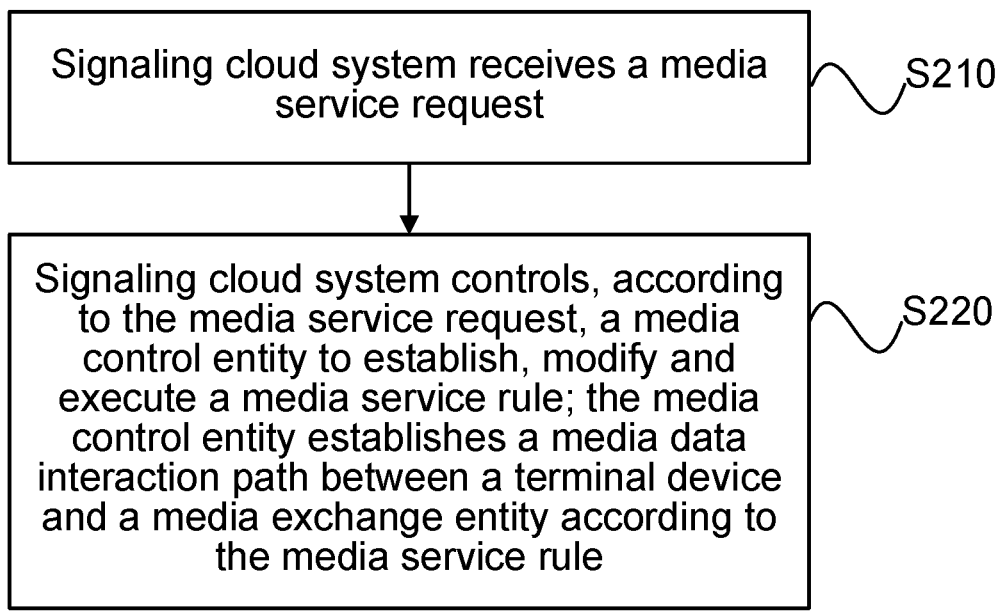
FIG. 2 depicts a flowchart showing a method for multimedia cloud service according to an embodiment of the present disclosure.

FIG. 1 depicts a schematic diagram showing a communication cloud system according to an embodiment of the present disclosure; and FIG. 2 depicts a flowchart showing a method for multimedia cloud service according to an embodiment of the present disclosure.

According to a first aspect of the present disclosure, an embodiment provides a method for multimedia cloud service, which is applied to the communication cloud system shown in FIG. 1. The communication cloud system includes a signaling cloud system and a media cloud system. The signaling cloud system includes a signaling control entity.

The logical functional entities in the signaling cloud system access the media cloud system through the same interface to share the media capabilities. The media cloud system provides a dynamic programmable mechanism for media processing rules, and allows the signaling cloud system to control the media cloud to execute corresponding processing rules for session media.

The media cloud system includes a media service entity, a media exchange entity, and a media control entity.

The media service entity is configured to process media data and provide various media services, such as encoding and decoding conversion, speech recognition, text-to-speech, and live broadcast.

The media exchange entity is configured to send media data to a terminal device or to the media service entity, so as to realize the routing of the media data among different entities within the media cloud system.

The media control entity is configured to manage the media service resources of the media service entity and manage the media service rule, and control the media exchange entity and the media service entity to perform media processing.

Referring to FIG. 2, the method for multimedia cloud service includes the following operations S210 and S220.

At S210, a signaling cloud system receives a media service request.

At S220, the signaling cloud system controls, according to the media service request, a media control entity to process a media service rule; the media control entity establishes a media data interaction path between a terminal device and a media exchange entity according to the media service rule. It should be noted that processing the media service rule by the media control entity includes establishing, modifying and executing the media service rule.

In this embodiment, the communication cloud system is divided into a signaling cloud system and a media cloud system to realize the sharing of media resources in the communication cloud system. By dividing the media cloud system into three functional entities, namely, the media service entity, the media exchange entity and the media control entity, and associating media data interaction with media services through media service rules, the signaling cloud system is enabled to control the media control entity to process media service rules according to media service requests. The media control entity is enabled to establish a media data interaction path between a terminal device and the media exchange entity according to the media service rules. As such, the utilization rate of media resources and the expansion ability of media services are significantly enhanced, the constantly changing media service requirements in 5G and future communication networks can be met. It is possible to control the establishment of media data interaction paths by modifying media service rules, and the interaction delay of media data between communication parties is greatly reduced.

Figure 3:
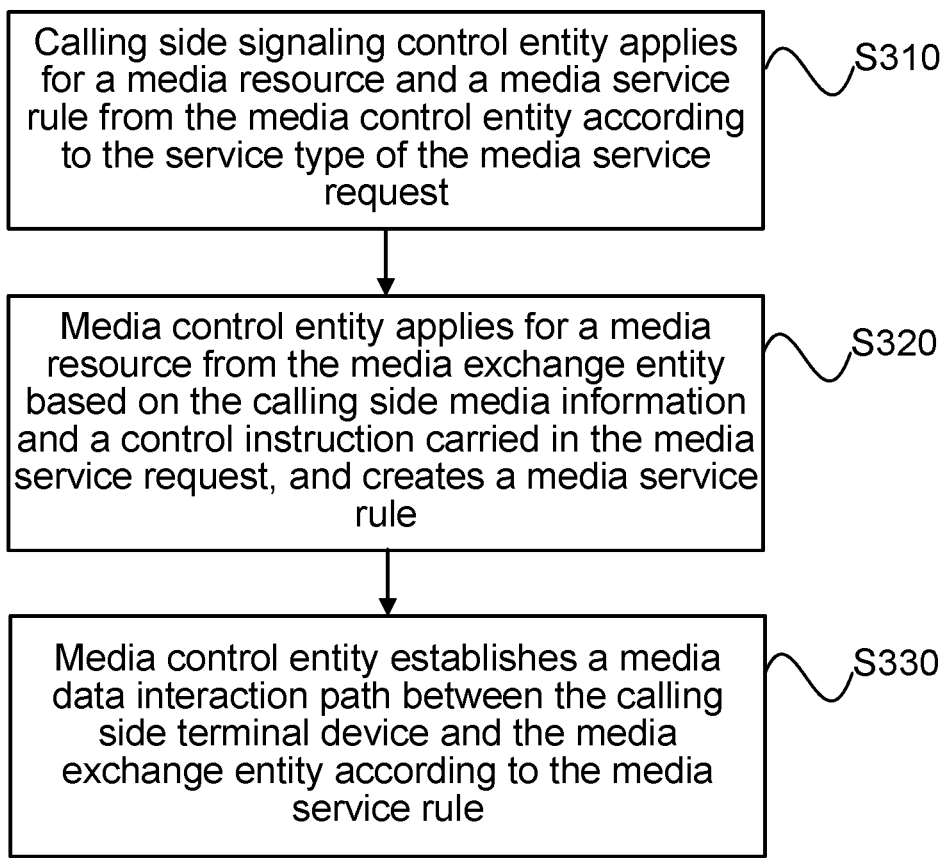
FIG. 3 depicts a flowchart showing a method for multimedia cloud service according to another embodiment of the present disclosure.

Referring to FIG. 3, in the method for multimedia cloud service of this embodiment, the signaling cloud system includes a calling side signaling control entity. The signaling cloud system is configured to receive a media service request through the calling side signaling control entity.

The operation S220 in which, the signaling cloud system controls, according to the media service request, a media control entity to process a media service rule; and the media control entity establishes a media data interaction path between a terminal device and a media exchange entity according to the media service rule, can further include the following operations S310, S320, and S330.

At S310, the calling side signaling control entity applies for a media resource and a media service rule from the media control entity according to the service type of the media service request.

At S320, the media control entity applies for a media resource from the media exchange entity based on the calling side media information and a control instruction carried in the media service request, and creates a media service rule.

At S330, the media control entity establishes a media data interaction path between the calling side terminal device and the media exchange entity according to the media service rule.

In this embodiment, the signaling cloud system includes a calling side signaling control entity that can support the method for multimedia cloud service of this embodiment. The signaling cloud system receives a media service request through the calling side signaling control entity, and then applies for the media resource and the media service rule from the media control entity in the media cloud system according to the media service request. The media exchange entity reserves the corresponding media resource and creates the media service rule, and in turn, establishes a media data interaction path between the calling side terminal device and the media exchange entity according to the media service rule. The calling side terminal device can send media data to the media exchange entity in the media cloud system.

Figure 4:
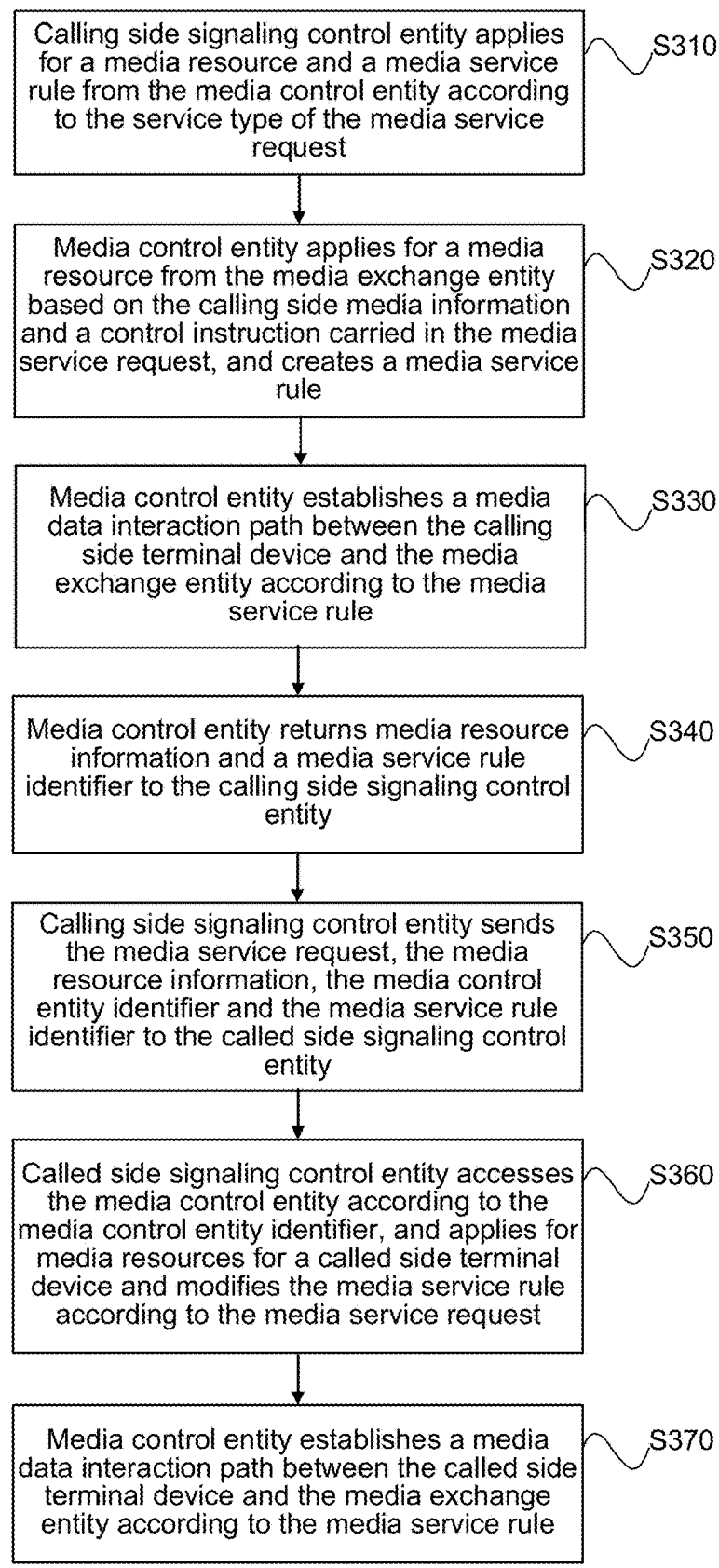
FIG. 4 depicts a flowchart showing a method for multimedia cloud service according to yet another embodiment of the present disclosure.

Referring to FIG. 4, in the multimedia cloud service method of this embodiment, the signaling cloud system further includes a called side signaling control entity in addition to the calling side signaling control entity described based on the embodiment shown in FIG. 3.

The operation S220 in which, the signaling cloud system controls, according to the media service request, a media control entity to process a media service rule; and the media control entity establishes a media data interaction path between a terminal device and a media exchange entity according to the media service rule, can further include the following operations S340 through S370.

At S340, the media control entity returns media resource information and a media service rule identifier to the calling side signaling control entity.

At S350, the calling side signaling control entity sends the media service request, the media resource information, the media control entity identifier, and the media service rule identifier to the called side signaling control entity.

At S360, the called side signaling control entity accesses the media control entity according to the media control entity identifier, applies for media resources for a called side terminal device, and modifies the media service rule according to the media service request.

At S370, the media control entity establishes a media data interaction path between the called side terminal device and the media exchange entity according to the media service rule.

In this embodiment, the signaling cloud system further includes a called side signaling control entity that can also support the method for multimedia cloud service of this embodiment. That is, both the calling side and the called side networks can support the method for multimedia cloud service of this embodiment. The media exchange entity reserves the corresponding media resources, creates the media service rule, and then returns the media resource information and the media service rule identifier to the calling side signaling control entity. The calling side signaling control entity forwards relevant information to the called side signaling control entity so that the called side signaling control entity can access the media control entity according to the media control entity identifier, apply for the media resource for the called side terminal device and modify the media service rule, and then establish a media data interaction path between the called side terminal device and the media exchange entity according to the modified media service rule. Thereby, the transmission of the media data to the media exchange entity in the media cloud system for processing by both the calling side terminal device and the called side terminal device, or direct media data interaction between the calling side terminal device and the called side terminal device is achieved.

In the method for multimedia cloud service shown in FIG. 4 above, the operation in which the media control entity establishes a media data interaction path between the called side terminal device and the media exchange entity according to the media service rule, includes the following. The media control entity returns the media resource information allocated to the called side terminal device, to the called side signaling control entity. The called side signaling control entity sends a session request to the called side terminal device. The called side terminal device returns a session response to the called side signaling control entity, in response to the session request. The called side signaling control entity updates the media service rule according to the session response, and instructs the media control entity to execute the media service rule, to establish a media data interaction path between the called side terminal device and the media exchange entity.

In this embodiment, before the media data interaction path is established between the called side terminal device and the media exchange entity, the called side signaling control entity obtains the media resource information allocated to the called side terminal device from the media control entity, and sends a session request to the called side terminal device, and then update the media service rule according to the session response of the called side terminal device.

Figure 5:
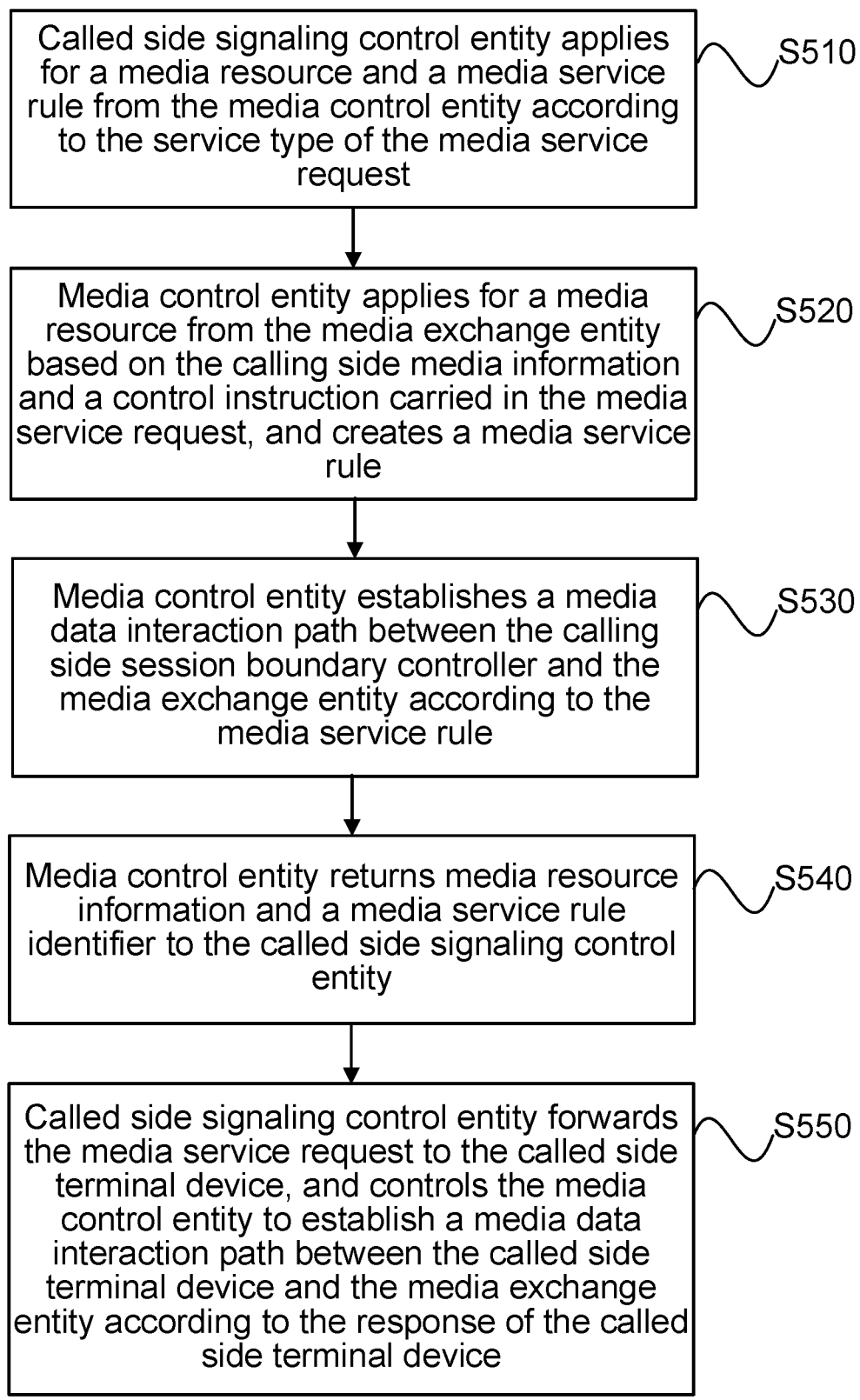
FIG. 5 depicts a flowchart showing a method for multimedia cloud service according to yet another embodiment of the present disclosure.

Referring to FIG. 5, in another embodiment of the method for multimedia cloud service, the signaling cloud system includes a called side signaling control entity, but does not include a calling side signaling control entity. The signaling cloud system receives the media service request sent by the calling side session boundary controller through the called side signaling control entity.

The operation S220 in which, the signaling cloud system controls, according to the media service request, a media control entity to process a media service rule; and the media control entity establishes a media data interaction path between a terminal device and a media exchange entity according to the media service rule, can further include the following operations S510 through S550.

At S510, the called side signaling control entity applies for a media resource and a media service rule from the media control entity according to the service type of the media service request.

At S520, the media control entity applies for a media resource from the media exchange entity based on the calling side media information and a control instruction carried in the media service request, and creates a media service rule.

At S530, the media control entity establishes a media data interaction path between the calling side session boundary controller and the media exchange entity according to the media service rule.

At S540, the media control entity returns media resource information and a media service rule identifier to the called side signaling control entity.

At S550, the called side signaling control entity forwards the media service request to the called side terminal device, and controls the media control entity to establish a media data interaction path between the called side terminal device and the media exchange entity according to the response of the called side terminal device.

In this embodiment, the signaling cloud system includes the called side signaling control entity, but does not include the calling side signaling control entity. The called side network can support the method for multimedia cloud service of this embodiment, while the calling side network does not support the method for multimedia cloud service of this embodiment. The calling side terminal device sends a media service request to the signaling cloud system through the calling side session boundary controller. After receiving the media service request, the called side signaling control entity in the signaling cloud system applies for the media resource and the media service rule from the media control entity in the media cloud system based on the media service request. The media exchange entity reserves the corresponding media resource and creates the media service rule. The media control entity first establishes a media data interaction path between the calling side session boundary controller and the media exchange entity based on the media service rule, and then returns media resource information and media service rule identifier to the called side signaling control entity, which in turn forwards the media service request to the called side terminal device. The media control entity is controlled, according to the response of the called side terminal device, to establish a media data interaction path between the called side terminal device and the media exchange entity. Both the calling side session boundary controller and the called side terminal device can send media data to the media exchange entity in the media cloud system.

According to a second aspect of the present disclosure, an embodiment provides a method for multimedia cloud service, which is applied to a signaling cloud system in a communication cloud system. The communication cloud system further includes a media cloud system including a media service entity configured to process media data, a media exchange entity configured to send media data to a terminal device or to the media service entity, and a media control entity configured to manage media service resources of the media service entity and manage the media service rules. The method includes, receiving a media service request; controlling the media control entity to process a media service rule based on the media service request, to cause the media control entity to establish, according to the media service rule, a media data interaction path between a terminal device and the media exchange entity.

In the method for multimedia cloud service of the embodiment in the second aspect, the signaling cloud system includes a calling side signaling control entity and/or a called side signaling control entity.

If the signaling cloud system includes a calling side signaling control entity, the signaling cloud system is configured to receive the media service request through the calling side signaling control entity, and the media control entity is configured to establish a media data interaction path between the calling side terminal device and the media exchange entity according to the media service rule.

If the signaling cloud system includes a called side signaling control entity and does not include a calling side signaling control entity, the signaling cloud system is configured to receive the media service request through the called side signaling control entity, and the media control entity is configured to establish a media data interaction path between the called side terminal device and the media exchange entity according to the media service rule.

According to a third aspect of the present disclosure, an embodiment provides a method for multimedia cloud service, which is applied to a media cloud system in a communication cloud system. The communication cloud system further includes a signaling cloud system. The media cloud system includes a media service entity configured to process media data, a media exchange entity configured to send media data to a terminal device or to the media service entity, and a media control entity configured to manage media service resources of the media service entity and manage the media service rules. The method includes, the media control entity processes a media service rule based on a media service request from the signaling cloud system, and establishes a media data interaction path between a terminal device and the media exchange entity according to the media service rule.

In the method for multimedia cloud service of the embodiment in the third aspect, the signaling cloud system includes a calling side signaling control entity and/or a called side signaling control entity.

If the signaling cloud system includes a calling side signaling control entity, the media control entity is configured to establish a media data interaction path between a calling side terminal device and the media exchange entity according to the media service rule.

If the signaling cloud system includes a called side signaling control entity and does not include a calling side signaling control entity, the media control entity is configured to establish a media data interaction path between a called side terminal device and the media exchange entity according to the media service rule.

It can be understood that the principles and effects of the method for multimedia cloud service set forth in the embodiments regarding the second and third aspects can be understood with reference to the method for multimedia cloud service outlined in the embodiment regarding the first aspect, which thus will not be repeated here.

Several embodiments of the communication cloud system are proposed below based on the method for multimedia cloud service of the above embodiments.

According to a fourth aspect of the present disclosure, an embodiment provides a communication cloud system, which includes a media cloud system and a signaling cloud system as shown in FIG. 1.

The media cloud system includes a media service entity, a media exchange entity, and a media control entity. The media service entity is configured to process media data to provide media service. The media exchange entity is configured to send the media data to a terminal device or to the media service entity to exchange the media data. The media control entity is configured to manage the media service resources of the media service entity and manage the media service rules.

The signaling cloud system receives a media service request, and controls, according to the media service request, the media control entity to process a media service rule, to cause the media control entity to establish a media data interaction path between a terminal device and the media exchange entity according to the media service rule. It should be noted that processing the media service rule by the media control entity includes establishing, modifying and executing the media service rule.

In this embodiment, the communication cloud system is divided into a signaling cloud system and a media cloud system to realize the sharing of media resources in the communication cloud system. By dividing the media cloud system into three functional entities, namely, the media service entity, the media exchange entity and the media control entity, and associating media data interaction with media services through media service rules, the signaling cloud system is enabled to control the media control entity to process media service rules according to media service requests. The media control entity is enabled to establish a media data interaction path between a terminal device and the media exchange entity according to the media service rules. As such, the utilization rate of media resources and the expansion ability of media services are significantly enhanced, the constantly changing media service requirements in 5G and future communication networks can be met. It is possible to control the establishment of media data interaction paths by modifying media service rules, and the interaction delay of media data between communication parties is greatly reduced.

In a communication cloud system of an embodiment, the signaling cloud system includes a calling side signaling control entity, and the signaling cloud system receives a media service request through the calling side signaling control entity.

The operation in which, the signaling cloud system controls, according to the media service request, a media control entity to process a media service rule, to cause the media control entity to establish a media data interaction path between a terminal device and a media exchange entity according to the media service rule, includes, the calling side signaling control entity applies for media resources and the media service rule from the media control entity based on the service type of the media service request; the media control entity applies for media resources from the media exchange entity based on the calling side media information and control instructions carried in the media service request, and creates the media service rule; the media control entity establishes a media data interaction path between the calling side terminal device and the media exchange entity based on media service rule.

In this embodiment, the signaling cloud system includes a calling side signaling control entity that can support the method for multimedia cloud service of this embodiment. The signaling cloud system receives a media service request through the calling side signaling control entity, and then applies for the media resource and the media service rule from the media control entity in the media cloud system according to the media service request. The media exchange entity reserves the corresponding media resource and creates the media service rule, and in turn, establishes a media data interaction path between the calling terminal device and the media exchange entity according to the media service rule. The calling side terminal device can send media data to the media exchange entity in the media cloud system.

In the communication cloud system of an embodiment, the signaling cloud system further includes a called side signaling control entity.

The operations in which, the signaling cloud system controls the media control entity to process the media service rule according to the media service request, to cause the media control entity to establish a media data interactive path between the terminal device and the media exchange entity according to the media service rule, further include, the media control entity returns media resource information and media service rule identifier to the calling side signaling control entity; the calling side signaling control entity sends the media service request, the media resource information, the media control entity identifier, and the media service rule identifier to the called side signaling control entity; the called side signaling control entity accesses the media control entity based on the media control entity identifier, and applies for media resources and modifies the media service rule for the called side terminal device according to media service request; the media control entity establishes the media data interaction path between the called side terminal device and the media exchange entity based on the media service rule.

In this embodiment, the signaling cloud system further includes a called side signaling control entity that can also support the method for multimedia cloud service of this embodiment. That is, both the calling side and the called side networks can support the method for multimedia cloud service of this embodiment. The media exchange entity reserves the corresponding media resources and creates the media service rule, and then returns the media resource information and the media service rule identifier to the calling side signaling control entity. The calling side signaling control entity forwards relevant information to the called side signaling control entity, so that the called side signaling control entity can access the media control entity according to the media control entity identifier, apply for the media resource for the called side terminal device and modify the media service rule, and then establish a media data interaction path between the called side terminal device and the media exchange entity according to the modified media service rule. Thereby, the transmission of the media data to the media exchange entity in the media cloud system for processing by both the calling side terminal device and the called side terminal device, or direct media data interaction between the calling side terminal device and the called side terminal device is achieved.

In a communication cloud system of an embodiment, the operation in which the media control entity establishes the media data interaction path between the called side terminal device and the media exchange entity according to the media service rule, includes the following operations, the media control entity returns media resource information allocated to the called side terminal device to the called side signaling control entity; the called side signaling control entity sends a session request to the called side terminal device; the called side terminal device returns a session response to the called side signaling control entity, in response to the session request; the called side signaling control entity updates the media service rule according to the session response, and instructs the media control entity to execute the media service rule, so as to establish the media data interaction path between the called side terminal device and the media exchange entity.

In this embodiment, before the media data interaction path is established between the called side terminal device and the media exchange entity, the called side signaling control entity obtains the media resource information allocated to the called side terminal device from the media control entity, and sends a session request to the called side terminal device, and then updates the media service rule according to the session response of the called side terminal device.

In a communication cloud system of an embodiment, the signaling cloud system includes a called side signaling control entity. In such a case, the signaling cloud system receives the media service request sent by the calling side session boundary controller through the called side signaling control entity.

The operation in which, the signaling cloud system controls, according to the media service request, a media control entity to process a media service rule; the media control entity establishes a media data interaction path between a terminal device and a media exchange entity according to the media service rule, includes, the called side signaling control entity applies for media resources and the media service rule from the media control entity based on the service type of the media service request; the media control entity applies for media resources from the media exchange entity based on the calling side media information and control instructions carried in the media service request, and creates the media service rule; the media control entity establishes a media data interaction path between the calling side session boundary controller and the media exchange entity based on media service rule; the media control entity returns media resource information and media service rule identifier to the called side signaling control entity; the called side signaling control entity forwards the media service request to the called side terminal device, and controls the media control entity to establish a media data interaction path between the called side terminal device and the media exchange entity based on the response of the called side terminal device.

In this embodiment, the signaling cloud system includes the called side signaling control entity, but does not include the calling side signaling control entity. The called side network can support the method for multimedia cloud service of this embodiment, while the calling side network does not support the method for multimedia cloud service of this embodiment. The calling side terminal device sends a media service request to the signaling cloud system through the calling side session boundary controller. After receiving the media service request, the called side signaling control entity in the signaling cloud system applies for the media resource and the media service rule from the media control entity in the media cloud system based on the media service request. The media exchange entity reserves the corresponding media resource and creates the media service rule. The media control entity first establishes a media data interaction path between the calling side session boundary controller and the media exchange entity based on the media service rule, then returns media resource information and media service rule identifier to the called side signaling control entity, and the called side signaling control entity in turn forwards the media service request to the called side terminal device. The media control entity is controlled, according to the response of the called side terminal device, to establish a media data interaction path between the called side terminal device and the media exchange entity. Both the calling side session boundary controller and the called side terminal device can send media data to the media exchange entity in the media cloud system.

According to a fifth aspect of the present disclosure, an embodiment provides a signaling cloud system. As shown in FIG. 1, the signaling cloud system is connected with a terminal device and a media cloud system respectively. The media cloud system includes a media service entity configured to process media data, a media exchange entity configured to send media data to the terminal device or to the media service entity, and a media control entity configured to manage media service resources of the media service entity and to manage the media service rules.

The signaling cloud system is configured to receive a media service request.

The signaling cloud system controls, according to the media service request, a media control entity to process a media service rule, such that the media control entity establishes a media data interaction path between a terminal device and a media exchange entity according to the media service rule.

In the signaling cloud system of the embodiment in the fifth aspect, the signaling cloud system includes a calling side signaling control entity and/or a called side signaling control entity.

If the signaling cloud system includes a calling side signaling control entity, the signaling cloud system is configured to receive the media service request through the calling side signaling control entity, and the media control entity is configured to establish a media data interaction path between the calling side terminal device and the media exchange entity according to the media service rule.

If the signaling cloud system includes a called side signaling control entity and does not include a calling side signaling control entity, the signaling cloud system is configured to receive the media service request through the called side signaling control entity, and the media control entity is configured to establish a media data interaction path between the called side terminal device and the media exchange entity according to the media service rule.

According to a sixth aspect of the present disclosure, an embodiment provides a media cloud system. The media cloud system is connected with a signaling cloud system. The media cloud system includes a media service entity configured to process media data, a media exchange entity configured to send media data to the terminal device or to the media service entity, and a media control entity configured to manage media service resources of the media service entity and to manage the media service rules.

The media control entity processes the media service rule according to the media service request from the signaling cloud system, and establishes a media data interaction path between the terminal device and the media exchange entity according to the media service rule.

In the media cloud system of the embodiment in the sixth aspect, the signaling cloud system includes a calling side signaling control entity and/or a called side signaling control entity.

If the signaling cloud system includes a calling side signaling control entity, the media control entity is configured to establish a media data interaction path between a calling side terminal device and the media exchange entity according to the media service rule.

If the signaling cloud system includes a called side signaling control entity and does not include a calling side signaling control entity, the media control entity is configured to establish a media data interaction path between a called side terminal device and the media exchange entity according to the media service rule.

It can be understood that the principles and effects of the signaling cloud system set forth in the embodiment regarding the fifth aspect and the media cloud system set forth in the embodiment regarding the sixth aspect, can be understood with reference to the communication cloud system set forth in the embodiment regarding the fourth aspect, which thus will not be repeated here.

Below, the application of some embodiments of the present disclosure in various service types will be introduced in conjunction with some detailed media service examples.

The system involved in an embodiment of present disclosure is improved based on the original IMS system architecture. The involved network element entities include signaling control entities, media control entities, media exchange entities, media service entities and terminal devices.

Signaling control entity: an entity that is responsible for establishing communication sessions and controlling media resources. In an embodiment of the present disclosure, the signaling control entity may be a terminal device network side access service entity (e.g., Session Border Controller/Proxy—Call Session Control Function, SBC/P-CSCF), a service-providing application server (Application Server, AS), a Media Gateway Control Function (MGCF), a multimedia network interconnection equipment (e.g., Interconnection Border Control Functions, IBCF), or the like.

Media control entity: an entity that is responsible for managing media resources and media service rules, including creation, modification, deletion, and inquiry, and providing external media services through interaction with the media exchange entity and media service entity. In particular, management of media exchange resources, media service resources, and media service rules is included. The management of media exchange resources refers to: receiving the request from the signaling control entity, interacting with the media exchange entity, and performing operations on the media resources such as creating, modifying, deleting, and querying. The management of media service resources refers to: receiving the request from the signaling control entity, interacting with the media service entity, and performing operations to the media service, such as creating, modifying, deleting, and querying. The management of media service rules refers to: managing media service rules according to the request from the signaling control entity, including creation, modification, deletion, inquiry, etc; parsing the media service rules; interacting with the media exchange entity and the media service entity, and controlling the media data processing procedure.

Media exchange entity: an entity that is configured to interact with the media control entity, obtain the information of a terminal device or the media service entity and the media forwarding instruction, and send the media data to the terminal device or the media service entity to exchange media data.

Media service entity: an entity that is configured to interact with the media control entity and provide management of media service resources, including creation, modification, deletion, and query; receive the control instruction from the media control entity, provide services for the media data, and send the processed media data to the media exchange entity which in turn sends the processed media data to the destination.

Terminal device: a device that is configured to interact with the signaling control entity to complete the establishment of the session; generate media data through local collection, and send the data to the media exchange entity which in turn the data to a peer; receive media data forwarded by the media exchange entity and present the same locally. An embodiment of the present disclosure does not have a special requirement on the terminal device.

Standard protocols such as SIP/HTTP or other self-defined protocols can be employed between the signaling cloud system and the media cloud system in an embodiment of the present disclosure. Standard protocols or other protocols can be employed between the initiator device, the receiver device, and the signaling cloud system/media cloud system, which are all within the scope of the present disclosure.

It can be understood that the present disclosure can be compatible with existing terminal devices, and only the network side equipment is to be functionally upgraded, thus effectively ensuring the applicability of the present disclosure.

Figure 6:
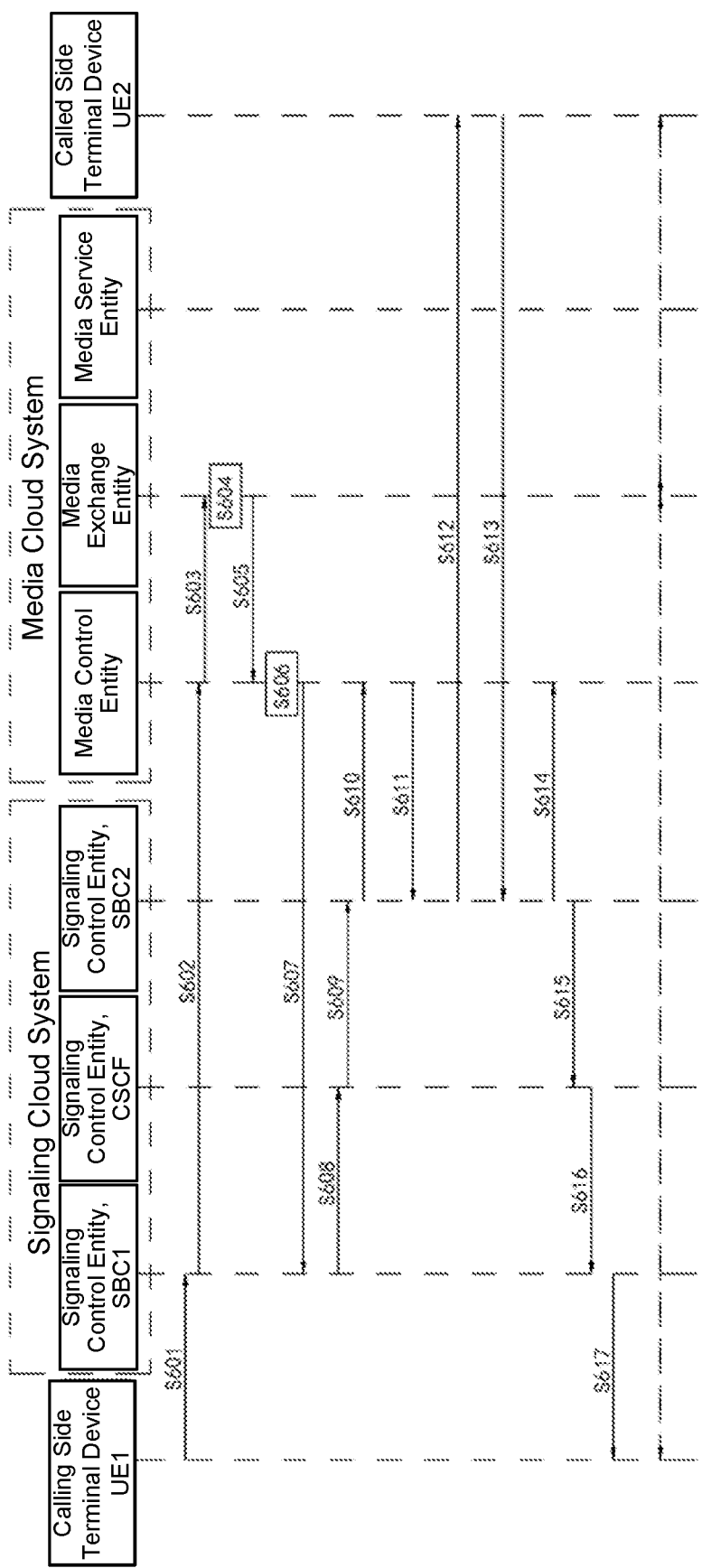
FIG. 6 depicts a flow chart showing a procedure of a point-to-point basic call according to an embodiment of the present disclosure.

Shown in FIG. 6 is an embodiment of a point-to-point basic call describing the procedure of an implementation of the point-to-point basic call in the present disclosure. This embodiment is illustrated with IMS by way of an example, while other signaling systems are also applicable to the methods described in the present disclosure. In this example, in order to highlight the invention, the interaction between the signaling control entity CSCF and the signaling control entity AS is omitted in the procedure.

At S601, a calling side terminal device, UE1 sends a call request, INVITE, to the signaling control entity, SBC1, the current call is designated as a point-to-point basic voice call in the SIP message, and the Session Description Protocol (SDP) information carries media information of the voice, including the IP address, port and supported audio codec types of the terminal device side.

At S602, the signaling control entity, SBC1 sends a media forwarding resource and a media session policy application to the media control entity, in which the media information (IP address, port number, etc.) of the terminal device is carried.

At S603, the media control entity creates a media session rule for this session, and applies to the media exchange entity for Real-time Transport Protocol (RTP) forwarding resources, including the IP address and port number of the terminal device.

At S604, after receiving the RTP forwarding resource application request, the media exchange entity creates RTP forwarding resources (user side IP, user side port, network side IP and network side port) for the terminal device.

At S605, the media exchange entity returns the RTP forwarding resources to the media control entity.

At S606, the media control entity establishes a media session policy (UE1→SBC1 user-side RTP information-→SBC1 network-side RTP information, SBC1 network-side RTP information→SBC1 user-side RTP information→UE1) to associate the calling side terminal device UE1 with the RTP forwarding resources.

At S607, the media control entity returns the RTP forwarding resource and the media session policy identifier to the signaling control entity, SBC1.

At S608, the signaling control entity, SBC1 forwards the session request, INVITE, to the signaling control entity CSCF, where the SDP information of the session request, INVITE, carries the RTP forwarding resources, and the SIP header carries the media control entity identifier and the media session policy identifier.

At S609, the signaling control entity, CSCF forwards the session request to the called side signaling control entity, SBC2 where the called user is registered.

At S610, the called side signaling control entity, SBC2 determines that the media resources have been applied for the session according to the media control entity and the media session policy identifier in the session request, and queries the media control entity in the session request for the resources corresponding to the specified media session policy identifier.

At S611, the media control entity returns the RTP exchange resource that has been applied for by the calling side to the called side signaling control entity, SBC2.

At S612, the called side signaling control entity, SBC2 employs the RTP exchange resources for which the calling side has applied and carries the resources in the session request, INVITE forwarded to the called side terminal device, UE2.

At S613, the called side terminal device, UE2 returns a response carrying the SDP of the called side terminal device, to the called side signaling control entity, SBC2.

At S614, the called side signaling control entity, SBC2 sends a media session policy update request to the media control entity, to update the paths for RTP exchange resources to "calling side terminal device UE1→SBC1 user-side RTP information→called side terminal device UE2" and "called side terminal device UE2→SBC1 user-side RTP information→calling side terminal device UE1", and informs the media control entity to execute the media session policy.

At S615, the called side signaling control entity, SBC2 forwards the response to the signaling control entity, CSCF, in which the SDP carries the RTP forwarding resources, and the media session policy identifier of the SIP header carries a parameter indicating that the media session policy has been updated.

At S616, the signaling control entity, CSCF forwards the response to the calling side signaling control entity, SBC1, in which the SDP carries the RTP forwarding resources.

At S617, the calling side signaling control entity, SBC1 determines that the current media path has been established according to the indication in the SIP header that the media session policy has been updated, and forwards a response to the calling side terminal device, where the SDP carries the RTP forwarding resource information (IP address and port) of the calling side terminal device, UE1.

After receiving the response, the calling side terminal device, UE1 sends the media data towards the RTP forwarding resource information (IP address and port) in the response. At this stage, the calling side terminal device, UE1 and the called side terminal device, UE2 can send and receive media data through the RTP forwarding resource of the media exchange entity.

Figure 7:
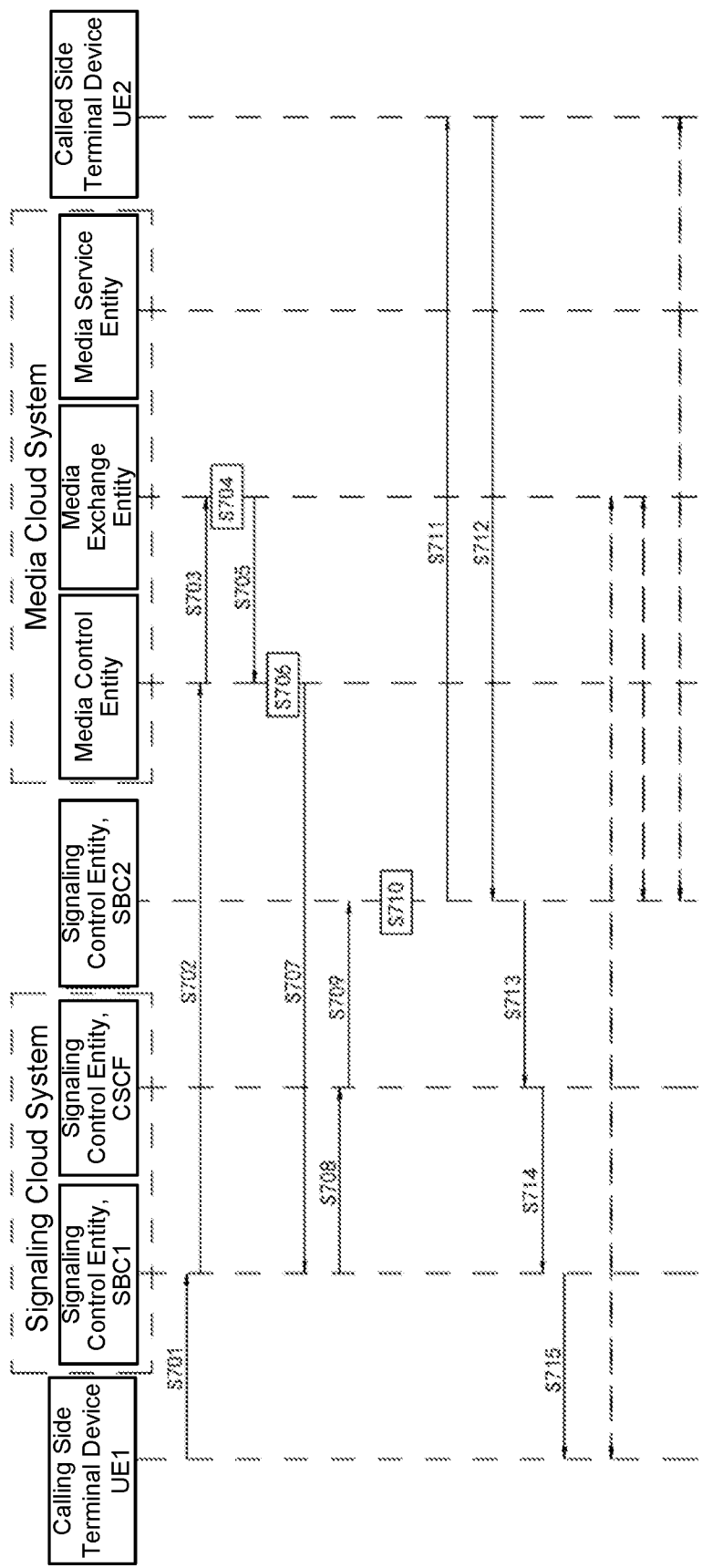
FIG. 7 depicts a flow chart showing a procedure of a point-to-point basic call with asymmetric capabilities (an unable called side) according to an embodiment of the present disclosure.

Shown in FIG. 7 is an embodiment of asymmetric point-to-point basic calling capability, which describes the interaction flow when one side of the communication network supports the method in an embodiment of the present disclosure while the other side (the called side) does not. This embodiment is illustrated with IMS as a signaling cloud system by way of an example, while other signaling systems are also applicable to the method described in any one of the embodiments of the present disclosure. In this example, in order to highlight the invention, the interaction between the signaling control entity CSCF and the signaling control entity AS is omitted in the procedure. This example describes a scenario where the calling side network supports the method of an embodiment of the present disclosure while the called side network does not support the method of an embodiment of the present disclosure.

At S701, a calling side terminal device, UE1 sends a call request, INVITE, to the signaling control entity, SBC1, where the current call is designated as a point-to-point basic voice call in the SIP message, and media information of the voice is carried in the SDP, including the IP address, port and supported audio codec types of the terminal device side.

At S702, the signaling control entity, SBC1 sends a media forwarding resource and a media session policy application to the media control entity, in which the media information (IP address, port number, etc.) of the terminal device is carried.

At S703, the media control entity creates a media session rule for this session, and applies to the media exchange entity for RTP forwarding resources, in which information like the IP address and port number of the terminal device is included.

At S704, after receiving the RTP forwarding resource application request, the media exchange entity creates RTP forwarding resources (user side IP, user side port, network side IP and network side port) for the terminal device.

At S705, the media exchange entity returns the RTP forwarding resources to the media control entity.

At S706, the media control entity establishes a media session policy (UE1→SBC1 user-side RTP information-→SBC1 network-side RTP information, SBC1 network-side RTP information→SBC1 user-side RTP information→UE1) to associate the calling side terminal device UE1 with the RTP forwarding resources.

At S707, the media control entity returns the RTP forwarding resource and the media session policy identifier to the signaling control entity, SBC1.

At S708, the signaling control entity, SBC1 forwards the session request, INVITE, to the signaling control entity, CSCF, where the SDP of the session request, INVITE, carries the RTP forwarding resources, and the SIP header carries the media control entity identifier and the media session policy identifier.

At S709, the signaling control entity, CSCF forwards the session request to the called side signaling control entity, SBC2 where the called user is registered.

At S710, the called side signaling control entity, SBC2 does not support the method of an embodiment of the present disclosure, ignores the media resource information header in the SIP request, and applies for media resources according to the existing mechanism.

At S711, the called side signaling control entity SBC2, employs the media resources applied by this side and carries them in the session request, INVITE forwarded to the called side terminal device, UE2.

At S712: the called side terminal device, UE2 returns a response to the called side signaling control entity, SBC2, in which the SDP of the called side terminal device, UE2 is carried.

At S713, the called side signaling control entity, SBC2 forwards the response to the signaling control entity, CSCF, in which the SDP carries the resources for which the SBC2 side applies.

At S714, the signaling control entity, CSCF forwards the response to the calling side signaling control entity, SBC1.

At S715, the calling side signaling control entity SBC1 finds that there is no media resource header in the SIP header, and employs the applied resources to forward the response to the calling side terminal device.

After receiving the response, the calling side terminal device, UE1 sends the media data towards the RTP forwarding resource information (IP address and port) in the response. At this stage, the calling side terminal device, UE1 and the called side terminal device, UE2 can send and receive media data through conventional media forwarding paths.

Figure 8:
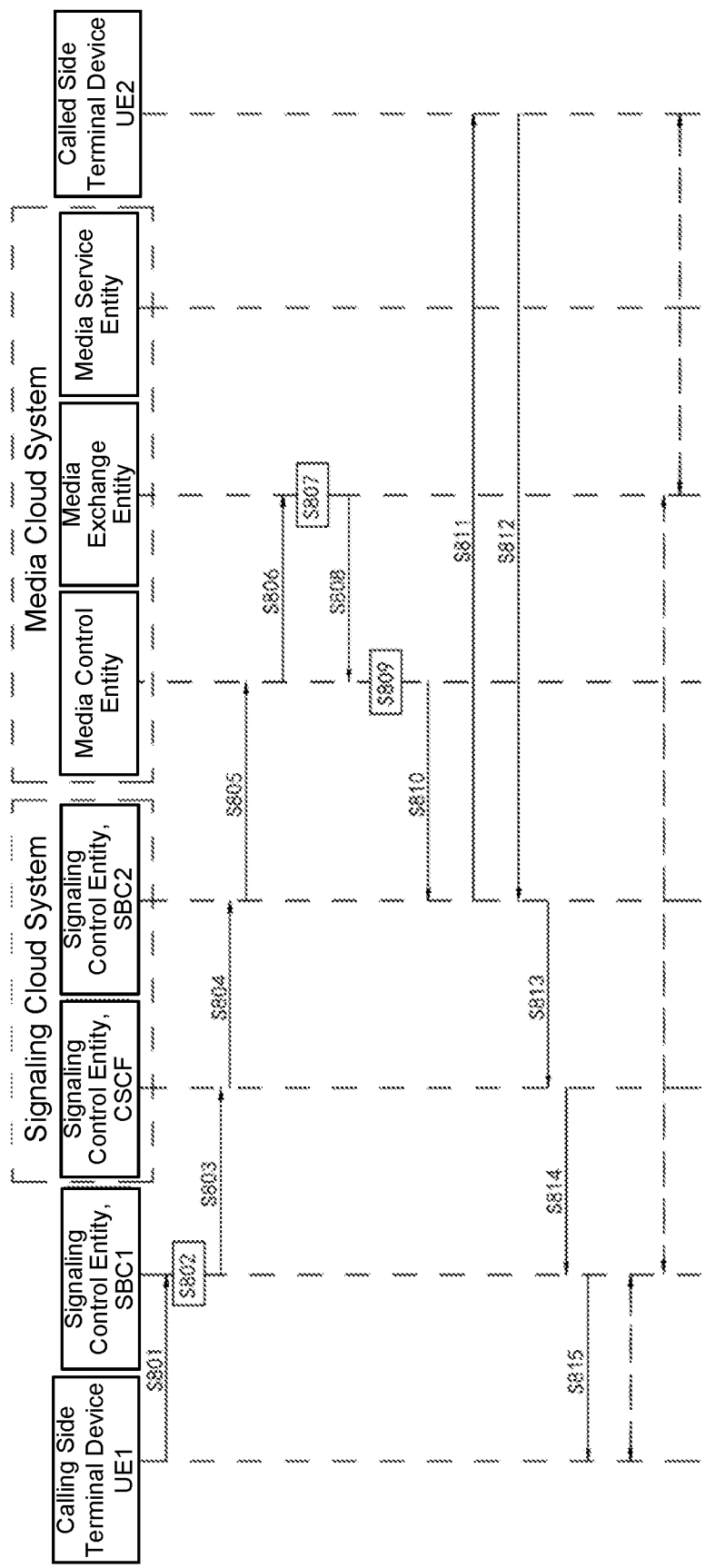
FIG. 8 depicts a flow chart showing a procedure of a point-to-point basic call with asymmetric capabilities (an unable calling side) according to an embodiment of the present disclosure.

Shown in FIG. 8 is an embodiment of asymmetric point-to-point basic calling capability, which describes the interaction flow when one side of the communication network supports the method in an embodiment of the present disclosure while the other side (the calling side) does not.

This embodiment is illustrated with IMS as a signaling cloud system by way of an example, while other signaling systems are also applicable to the method described in any one of the embodiments of the present disclosure. In this example, in order to highlight the invention, the interaction between the signaling control entity CSCF and the signaling control entity AS is omitted in the procedure. This example describes a scenario where the calling side network does not support the method of an embodiment of the present disclosure while the called side network supports the method of an embodiment of the present disclosure.

At S801, a calling side terminal device, UE1 sends a call request, INVITE, to the signaling control entity, SBC1, where the current call is designated as a point-to-point basic voice call in the SIP message, and media information of the voice is carried in the SDP, including the IP address, port and supported audio codec types of the terminal device side.

At S802, the signaling control entity, SBC1 does not support the method of an embodiment of the present disclosure, and applies for local resources according to the existing mechanism.

At S803, the signaling control entity, SBC1 forwards the session request, INVITE to the signaling control entity, CSCF, where the SIP header of the session request, INVITE does not carry the media control entity identifier and the media session policy identifier.

At S804, the signaling control entity, CSCF forwards the session request to the called side signaling control entity, SBC2 where the called user is registered.

At S805, the called side signaling control entity, SBC2 supports the method in an embodiment of the present disclosure, and sends a media forwarding resource and a media session policy application to the media control entity, in which the media information (IP address, port number, etc.) of the signaling control entity, SBC1 is carried.

At S806, the media control entity creates a media session rule for this session, and applies to the media exchange entity for RTP forwarding resources, in which information like the IP address and port number of the SBC1 is included.

At S807, after receiving the RTP forwarding resource application request, the media exchange entity creates RTP forwarding resources (user side IP, user side port, network side IP and network side port) for the terminal device UE2.

At S808, the media exchange entity returns the RTP forwarding resources to the media control entity.

At S809, the media control entity establishes a media session policy (SBC1 network-side RTP information→SBC2 network-side RTP information→SBC2 user-side RTP information, SBC2 user-side RTP information→SBC2 network-side RTP information→SBC1 user-side RTP information) to associate SBC1 and the RTP forwarding resources.

At S810, the media control entity returns the RTP forwarding resource and the media session policy identifier to the signaling control entity, SBC2.

At S811, the signaling control entity, SBC2 forwards the session request, INVITE to the called side terminal device UE2.

At S812: the called side terminal device, UE2 returns a response to the called side signaling control entity, SBC2, in which the SDP of the called side terminal device, UE2 is carried.

At S813, the called side signaling control entity, SBC2 forwards the response to the signaling control entity, CSCF, in which the SDP carries the resources for which the SBC2 side applies.

At S814, the signaling control entity, CSCF forwards the response to the calling side signaling control entity, SBC1.

At S815, the calling side signaling control entity, SBC1 forwards the response to the calling side terminal device.

After receiving the response, the calling side terminal device, UE1 sends the media data to SBC1. At this stage, the calling side terminal device UE1 and the called side terminal device UE2 can send and receive media streams through an existing media path.

Figure 9:
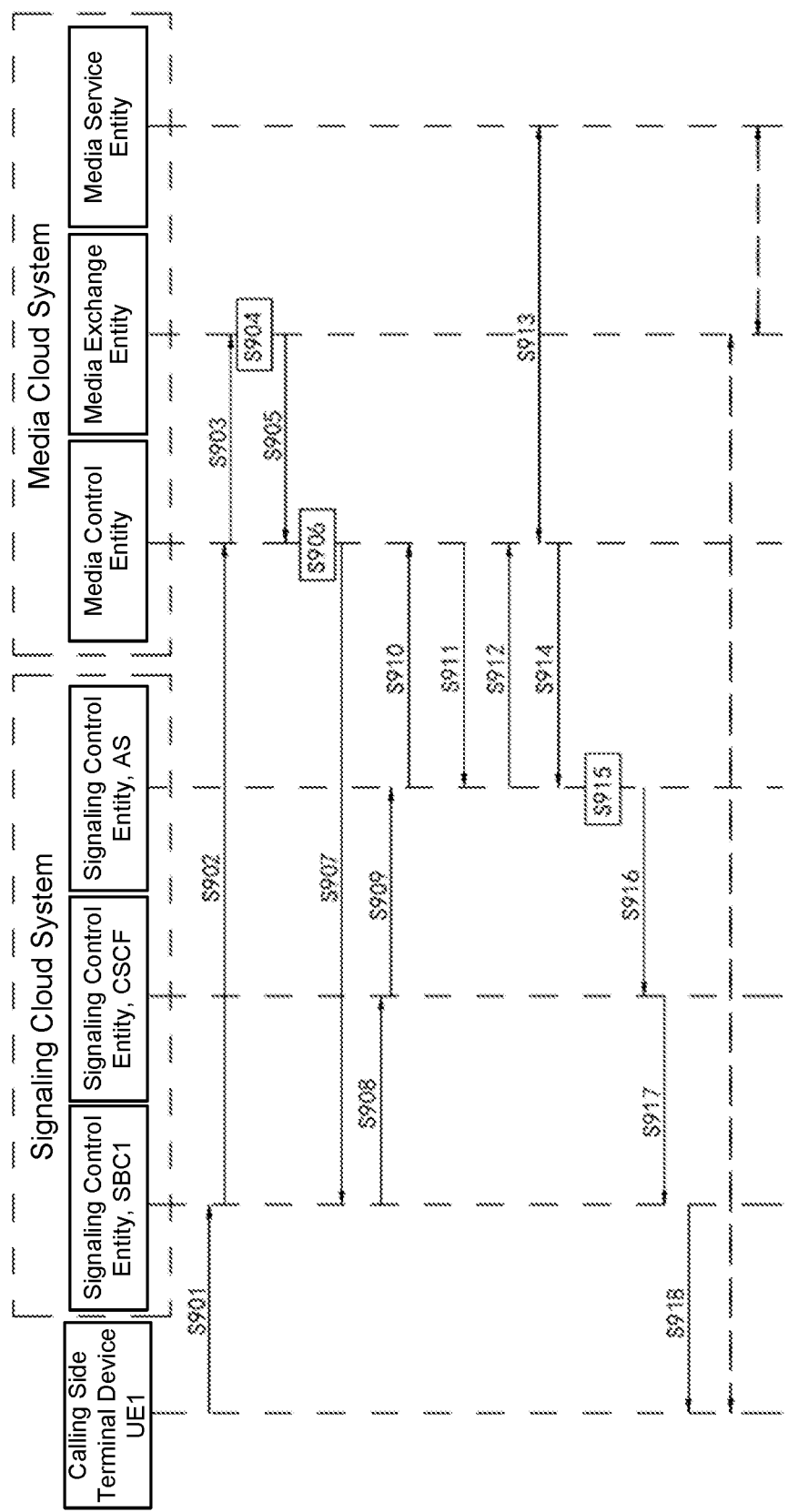
FIG. 9 depicts a schematic flow chart showing a procedure of realizing the calling side IVR service according to an embodiment of the present disclosure.

Shown in FIG. 9 is an embodiment of Interactive Voice Response (IVR) service on the calling side, which describes the flow of implementing IVR service on the calling side according to an embodiment of the present disclosure. This embodiment is illustrated with IMS as a signaling cloud system by way of an example, while other signaling systems are also applicable to the method described in any one of the embodiments of the present disclosure.

At S901, a calling side terminal device, UE1 sends a call request, INVITE, to the signaling control entity, SBC1, where the current call is designated as a point-to-point basic voice call in the SIP message, and media information of the voice is carried in the SDP, including the IP address, port and supported audio codec types of the terminal device side.

At S902, the signaling control entity, SBC1 sends a media forwarding resource and a media session policy application to the media control entity, in which the media information (IP address, port number, etc.) of the terminal device is carried.

At S903, the media control entity creates a media session rule for this session, and applies to the media exchange entity for RTP forwarding resources, in which information like the IP address and port number of the terminal device is included.

At S904, after receiving the RTP forwarding resource application request, the media exchange entity creates RTP forwarding resources (user side IP, user side port, network side IP and network side port) for the terminal device.

At S905, the media exchange entity returns the RTP forwarding resources to the media control entity.

At S906, the media control entity establishes a media session policy (UE1→SBC1 user-side RTP information→SBC1 network-side RTP information, SBC1 network-side RTP information→SBC1 user-side RTP information→UE1) to associate the calling side terminal device UE1 with the RTP forwarding resources.

At S907, the media control entity returns the RTP forwarding resource and the media session policy identifier to the signaling control entity, SBC1.

At S908, the signaling control entity, SBC1 forwards the session request, INVITE, to the signaling control entity CSCF, where the SDP of the session request, INVITE, carries the RTP forwarding resources, and the SIP header carries the media control entity identifier and the media session policy identifier.

At S909, the signaling control entity, CSCF analyzes the called number, determines it is an IVR call, and forwards the session request to the signaling control entity, AS.

At S910, the signaling control entity, AS determines that the media resources have been applied for the session according to the media control entity and the media session policy identifier in the session request, and queries the media control entity in the session request for the resources corresponding to the specified media session policy identifier.

At S911, the media control entity returns the RTP exchange resources for which the signaling control entity, SBC1 has applied and the media session policy to the signaling control entity, AS.

At S912, the signaling control entity, AS applies for "IVR Media Service" to the media control entity in the session request according to the IVR service demand.

At S913, after receiving the request for "IVR Media Service", the media control entity interacts with the media service entity to obtain IVR media service resources.

At S914, the media control entity returns the IVR media service identifier to the signaling control entity, AS.

At S915, the signaling control entity, AS sends a request to the media control entity to modify the media session policy to "UE1→SBC1 user-side RTP information→SBC1 network-side RTP information→IVR media service, IVR media service→SBC1 network-side RTP information-→SBC1 user-side RTP information→UE1".

At S916, the signaling control entity, AS returns a response to the signaling control entity, CSCF, in which the RTP information of the SBC1 network side is carried.

At S917, the signaling control entity, CSCF forwards the response to the signaling control entity, SBC1.

At S918, the signaling control entity, SBC1 replaces the information in the response SDP with SBC1 user-side RTP information and forwards the information to UE1.

At this stage, the media stream between the calling side terminal device, UE1 and AS is transmitted and received through the RTP forwarding resources, and at the same time, the media exchange entity interacts with IVR media service to complete IVR service.

Figure 10:
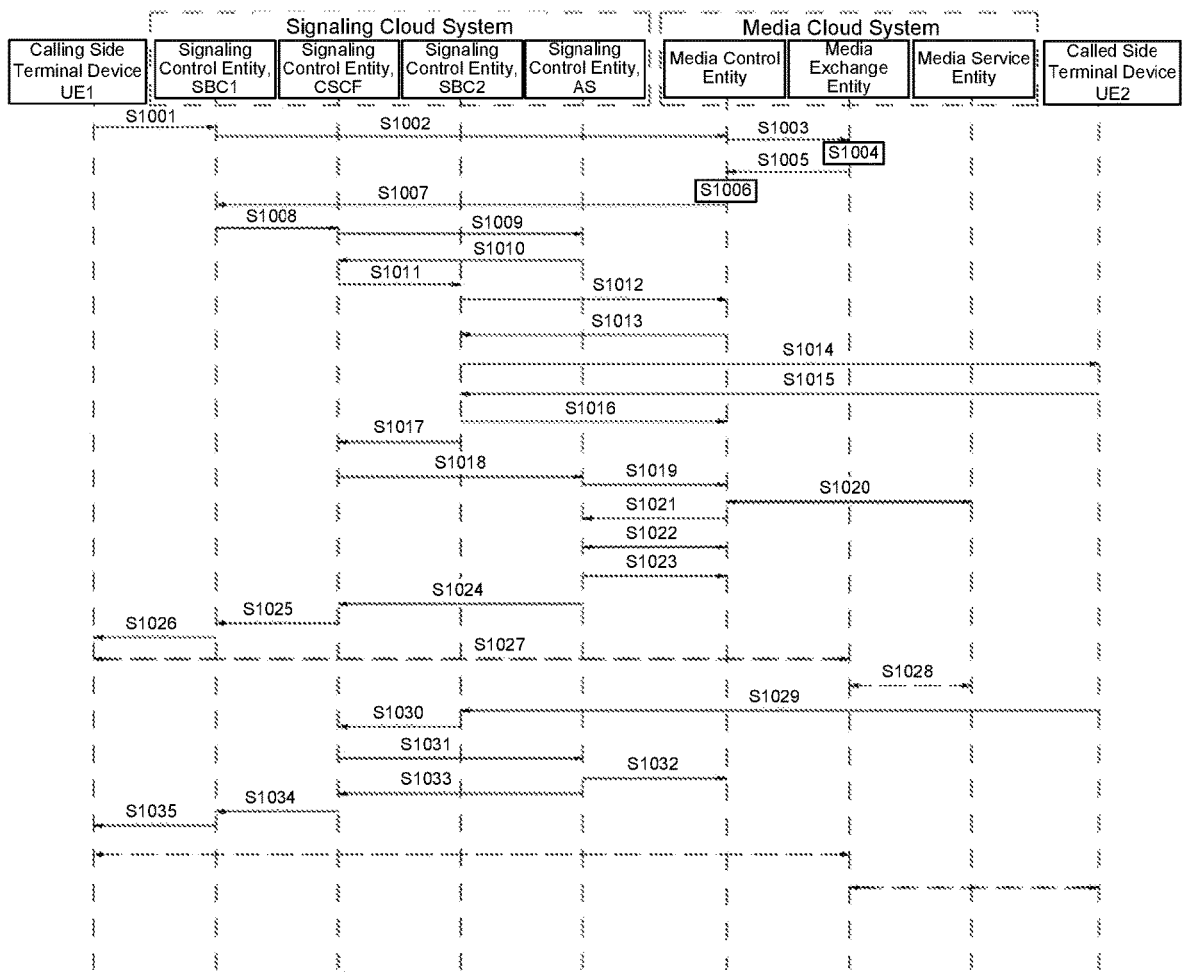
FIG. 10 depicts a flowchart showing an embodiment in which a called side plays an announcement to a calling side terminal device.

Shown in FIG. 10 is an embodiment in which the called side plays an announcement to the calling side terminal device, which describes the process of playing an announcement according to an embodiment of the present disclosure. This embodiment is illustrated with IMS as a signaling cloud system by way of an example, while other signaling systems are also applicable to the method described in any one of the embodiments of the present disclosure. In this example, in order to highlight the invention, the interaction between the signaling control entity CSCF and the calling side signaling control entity AS is omitted from the procedure.

At S1001, a calling side terminal device, UE1 sends a call request, INVITE, to the signaling control entity, SBC1, where the current call is designated as a point-to-point basic voice call in the SIP message, and media information of the voice is carried in the SDP, including the IP address, port and supported audio codec types of the terminal device side.

At S1002, the signaling control entity, SBC1 sends a media forwarding resource and a media session policy application to the media control entity, in which the media information (IP address, port number, etc.) of the terminal device is carried.

At S1003, the media control entity creates a media session rule for this session, and applies to the media exchange entity for RTP forwarding resources, including the IP address and port number of the terminal device.

At S1004, after receiving the RTP forwarding resource application request, the media exchange entity creates RTP forwarding resources (user side IP, user side port, network side IP and network side port) for the terminal device.

At S1005, the media exchange entity returns the RTP forwarding resources to the media control entity.

At S1006, the media control entity establishes a media session policy (UE1→SBC1 user-side RTP information-→SBC1 network-side RTP information, SBC1 network-side RTP information→SBC1 user-side RTP information→UE1) to associate the calling side terminal device UE1 with the RTP forwarding resources.

At S1007, the media control entity returns the RTP forwarding resource and the media session policy identifier to the signaling control entity, SBC1.

At S1008, the signaling control entity, SBC1 forwards the session request, INVITE, to the signaling control entity CSCF, where the SDP of the session request, INVITE, carries the RTP forwarding resources, and the SIP header carries the media control entity identifier and the media session policy identifier.

At S1009, the signaling control entity, CSCF forwards the session request to the called side signaling control entity, AS where the called user is registered.

At S1010, the called side signaling control entity AS determines that the current call state does not need service processing, and forwards the session request to the signaling control entity, CSCF.

At S1011, the signaling control entity, CSCF forwards the session request to the called side signaling control entity, SBC2 where the called user is registered.

At S1012, the called side signaling control entity, SBC2 determines that the media resources have been applied for the session according to the media control entity and the media session policy identifier in the session request, and queries the media control entity in the session request for the resources corresponding to the specified media session policy identifier.

At S1013, the media control entity returns the RTP exchange resource that has been applied for by the calling side to the called side signaling control entity, SBC2.

At S1014, the called side signaling control entity, SBC2 employs the RTP exchange resources (user-side RTP information) for which the calling side has applied, and carries the resources in the session request, INVITE forwarded to the called side terminal device, UE2.

At S1015, the called side terminal device, UE2 returns a ringing response to the called side signaling control entity, SBC2, in which the SDP of the called side terminal device is carried.

At S1016, the called side signaling control entity, SBC2 sends a media session policy update request to the media control entity, to update the paths for RTP exchange resources to "calling side terminal device UE1→SBC1 user-side RTP information→called side terminal device UE2" and "called side terminal device UE2→SBC1 user-side RTP information→calling side terminal device UE1".

At S1017, the called side signaling control entity, SBC2 forwards the ringing response to the signaling control entity, CSCF, in which the SDP carries the RTP forwarding resources and the media session policy identifier of the SIP header carries a parameter indicating that the media session policy has been updated.

At S1018, the signaling control entity, CSCF forwards the ringing response to the called side signaling control entity, AS.

At S1019, the called side signaling control entity, AS determines that the current call state needs an announcement on the calling side terminal device, and applies for "announcement service" to the media control entity.

At S1020, the media control entity interacts with the media service entity to distribute the "announcement service".

At S1021, the media control entity returns the "announcement service" identifier to the called side signaling control entity, AS.

At S1022, the called side signaling control entity, AS obtains the media session policy from the media control entity.

At S1023, the called side signaling control entity, AS stores the original media session policy, updates the media session policy to an announcement policy (announcement service→SBC1 user-side RTP information→calling side terminal device UE1), and sends a media session policy update instruction to the media control entity.

At S1024, the called side signaling control entity, AS forwards the ringing response to the signaling control entity, CSCF, in which the user-side RTP information for which the calling side signaling control entity, SBC1 applies, is carried.

At S1025, the signaling control entity, CSCF forwards the ringing response to SBC1.

At S1026, the signaling control entity, SBC1 sends a ringing response to the calling side terminal device UE1, where the message body carries the user-side RTP information for which SBC1 applies.

At S1027, after receiving the ringing response, the calling side terminal device, UE1 sends a media data message to the SBC1 user-side RTP information to activate the media channel.

At S1028, the media exchange entity forwards the terminal device side RTP media data packet to the media service entity, and the media service entity performs the announcement, and sends the audio of the announcement to the calling side terminal device UE1 through the media exchange entity; at this stage, the process of the called side AS controlling the media cloud to play the announcement to the calling side terminal device is completed.

At S1029, the called side terminal device UE1 sends a response to the called side signaling control entity, SBC2.

At S1030, the called side signaling control entity, SBC2 identifies the local side has completed the media session policy, and forwards the response to the signaling control entity, CSCF.

At S1031, the signaling control entity, CSCF forwards the response to the called side signaling control entity, AS according to the path in the response.

At S1032, after receiving the response, the called side signaling control entity, AS sends a request to the media control entity to cease playing the audio file and update the media session policy, and restore the policy to "calling side terminal device UE1→SBC1 user-side RTP information-→called side terminal device UE2" and "called side terminal device UE2→SBC1 user-side RTP information→calling side terminal device UE1".

At S1033, the called side signaling control entity, AS forwards the response to the signaling control entity, CSCF.

At S1034, the signaling control entity, CSCF forwards the response to the calling side signaling control entity, SBC1 according to the path in the response.

At S1035, the calling side signaling control entity, SBC1 forwards the response to the calling side terminal device, UE1.

At this stage, the calling side terminal device, and the called side terminal device, can send and receive media stream through the RTP forwarding resources of the media exchange entity.

Thus, compared with some situations, in the present disclosure, the communication cloud system is divided into a signaling cloud system and a media cloud system, so as to realize the sharing of media resources in the communication system and greatly improve the utilization rate of equipment resources. Besides, the media function is divided into three functional entities: media control entity, media exchange entity and media service entity, and the media data exchange and media service are associated with each other by the media service rules, which greatly improves the expansion ability of media services and which can adapt to the ever-changing service requirements in 5G and future communication networks. Through the smart control of the media interaction path, the interaction delay of media data between both communication parties is greatly reduced, which can meet the application requirements of low delay in 5G networks. The present disclosure can be compatible with existing terminal devices, and only the network side equipment has to be functionally upgraded, thus effectively ensuring the applicability of the present disclosure.

Figure 12:
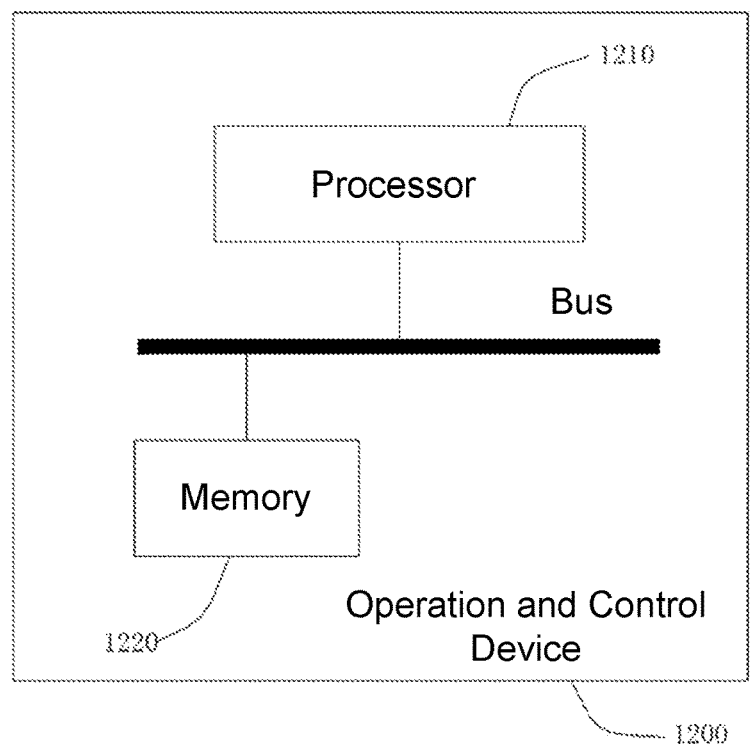
FIG. 12 depicts a schematic diagram showing an operation and control device according to an embodiment of the present disclosure.

According to a seventh aspect of the present disclosure, an embodiment provides an operation and control device 1200. As shown in FIG. 12, the device 1200 includes at least one processor 1210 and a memory 1220 configured to be communicatively connected with the at least one processor 1210. The memory 1220 stores an instruction executable by the at least one processor 1210 which, when executed by the at least one processor 1210, causes the at least one processor 1210 to carry out the method as described in the embodiment regarding any one aspect above, e.g., S210 to S220 described in conjunction with FIGS. 2, S310 to S330 described in conjunction with FIGS. 3, S310 to S370 described in conjunction with FIG. 4, or S510 to S550 described in conjunction with FIG. 5.

According to an eight aspect of the present disclosure, an embodiment provides a computer-readable storage medium, which stores a computer-executable instruction which, when executed by a processor or controller, for example, by a processor in the above-described processing device, causes the processor to carry out the method for multimedia cloud service described with respect to the first aspect, the second aspect or the third aspect of the present disclosure, e.g., S210 to S220 described in conjunction with FIGS. 2, S310 to S330 described in conjunction with FIGS. 3, S310 to S370 described in conjunction with FIG. 4, or S510 to S550 described in conjunction with FIG. 5.

Some embodiments of the present disclosure include a method for multimedia cloud service, a communication cloud system, a signaling cloud system, a media cloud system, an operation and control device, and a computer-readable storage medium. According to the scheme set forth in some embodiments of the present disclosure, the communication cloud system is divided into a signaling cloud system and a media cloud system to realize the sharing of media resources in the communication cloud system. By dividing the media cloud system into three functional entities, namely, the media service entity, the media exchange entity and the media control entity, and associating media data interaction with media services through media service rules, the signaling cloud system is enabled to control the media control entity to process media service rules according to media service requests. The media control entity is enabled to establish a media data interaction path between a terminal device and the media exchange entity according to the media service rules. As such, the utilization rate of media resources and the expansion ability of media services are significantly enhanced, the constantly changing media service requirements in 5G and future communication networks can be met. It is possible to control the establishment of media data interaction paths by modifying media service rules, and the interaction delay of media data between communication parties is greatly reduced.

It shall be appreciated by a person having ordinary skills in the art that all or some of the steps and systems disclosed above can be implemented as software, firmware, hardware and their appropriate combinations. Some or all physical components can be implemented as software executed by a processor, such as a central processing unit, a digital signal processor or a microprocessor, or as hardware, or as an integrated circuit, such as an application-specific integrated circuit. Such software can be distributed on computer-readable media, which can include computer storage media (or non-transitory media) and communication media (or transitory media). As is well known to a person having ordinary skills in the art, the term computer storage medium includes volatile and nonvolatile, removable and non-removable medium implemented in any method or technology for storing information such as computer-readable instructions, data structures, program modules, or other data. The computer storage medium includes but is not limited to, RAM, ROM, EEPROM, flash memory or other memory technologies, CD-ROM, digital versatile disks (DVD) or other optical disk storage, magnetic boxes, tapes, magnetic disk storage or other magnetic storage devices, or any other medium that can be used to store desired information and accessible by a computer. Furthermore, it is well known to those having ordinary skills in the art that communication media usually contains computer-readable instructions, data structures, program modules, or other data in modulated data signals such as carrier waves or other transmission mechanisms, and can include any information delivery media.

Some embodiments of the present disclosure are described in conjunction with the drawings above. However, the present disclosure is not limited thereto. Various alternations can be made within the knowledge of those having ordinary skills in the art without departing from the scope of the present disclosure.

What is claimed is:

1. A method for multimedia cloud service applied to a communication cloud system, the communication cloud system comprising a signaling cloud system and a media cloud system, the media cloud system comprising a media service entity configured to process media data, a media exchange entity configured to send the media data to a terminal device or to the media service entity, and a media control entity configured to manage a media service resource of the media service entity and to manage a media service rule, wherein the signaling cloud system comprises a calling side signaling control entity, the method comprises:
   receiving, by the signaling cloud system, a media service request through the calling side signaling control entity;
   applying, by the calling side signaling control entity, for a media resource and a media service rule from the media control entity, according to a service type of the media service request;
   applying, for a media resource from the media exchange entity based on calling side media information and a control instruction carried in the media service request, and creating a media service rule, by the media control entity; and
   establishing, by the media control entity, a media data interaction path between a calling side terminal device and the media exchange entity according to the media service rule.

2. The method as claimed in claim 1, wherein the signaling cloud system further comprises a called side signaling control entity, the further comprises, returning, by the media control entity, media resource information and a media service rule identifier to the calling side signaling control entity; sending, by the calling side signaling control entity, the media service request, the media resource information, a media control entity identifier and the media service rule identifier to the called side signaling control entity; accessing the media control entity according to the media control entity identifier, applying for a media resource and modifying the media service rule for a called side terminal device according to the media service request, by the called side signaling control entity; and establishing, by the media control entity, a media data interaction path between the called side terminal device and the media exchange entity according to the media service rule.

3. The method as claimed in claim 2, wherein establishing, by the media control entity, the media data interaction path between the called side terminal device and the media exchange entity according to the media service rule, comprises,
   returning, by the media control entity, media resource information allocated to the called side terminal device, to the called side signaling control entity;
   sending, by the called side signaling control entity, a session request to the called side terminal device;
   returning, by the called side terminal device, a session response to the called side signaling control entity, in response to the session request; and
   updating the media service rule according to the session response, and instructing the media control entity to execute the media service rule, by the called side signaling control entity, so as to establish the media data interaction path between the called side terminal device and the media exchange entity.

4. A method for multimedia cloud service applied to a communication cloud system, the communication cloud system comprising a signaling cloud system and a media cloud system, the media cloud system comprising a media service entity configured to process media data, a media exchange entity configured to send the media data to a terminal device or to the media service entity, and a media control entity configured to manage a media service resource of the media service entity and to manage a media service rule, wherein the signaling cloud system comprises a called side signaling control entity, the method comprises:
   receiving, by the signaling cloud system, a media service request sent by a calling side session boundary controller through the called side signaling control entity;
   applying, by the called side signaling control entity, for a media resource and a media service rule from the media control entity, according to a service type of the media service request;
   applying, for a media resource from the media exchange entity based on calling side media information and a control instruction carried in the media service request, and creating a media service rule, by the media control entity;
   establishing, by the media control entity, a media data interaction path between a calling side terminal device and the media exchange entity according to the media service rule;
   returning, by the media control entity, media resource information and a media service rule identifier to the called side signaling control entity; and
   forwarding the media service request to a called side terminal device, and controlling the media control entity to establish a media interaction path between the called side terminal device and the media exchange entity according to the response of the called side terminal device, by the called side signaling control entity.

5. A method for multimedia cloud service applied to a signaling cloud system in a communication cloud system, the communication cloud system further comprising a media cloud system, the media cloud system comprising a media service entity configured to process media data, a media exchange entity configured to send the media data to a terminal device or to the media service entity, and a media control entity configured to manage a media service resource of the media service entity and to manage a media service rule, the method comprises:

receiving a media service request; and controlling, according to the media service request, the media control entity to process a media service rule, to cause the media control entity to establish a media data interaction path between a terminal device and a media exchange entity according to the media service rule;

wherein the signaling cloud system comprises at least one of a calling side signaling control entity, or a called side signaling control entity;

in response to an inclusion of the calling side signaling control entity in the signaling cloud system, the signaling cloud system is configured to receive the media service request through the calling side signaling control entity, and the media control entity is configured to establish a media data interaction path between a calling side terminal device and the media exchange entity according to the media service rule; and in response to an inclusion of the called side signaling control entity and an exclusion of the calling side signaling control entity in the signaling cloud system, the signaling cloud system is configured to receive the media service request through the called side signaling control entity, and the media control entity is configured to establish a media data interaction path between a called side terminal device and the media exchange entity according to the media service rule.

6. A method for multimedia cloud service applied to a media cloud system in a communication cloud system, the communication cloud system further comprising a signaling cloud system, the media cloud system comprising a media service entity configured to process media data, a media exchange entity configured to send the media data to a terminal device or to the media service entity, and a media control entity configured to manage a media service resource of the media service entity and to manage a media service rule, the method comprises:

processing, by the media control entity, the media service rule according to a media service request from the signaling cloud system; and establishing, by the media control entity, a media data interaction path between a terminal device and the media exchange entity according to the media service rule;

wherein the signaling cloud system comprises at least one of a calling side signaling control entity, or a called side signaling control entity;

in response to an inclusion of the calling side signaling control entity in the signaling cloud system, the media control entity is configured to establish a media data interaction path between a calling side terminal device and the media exchange entity according to the media service rule; and in response to an inclusion of the called side signaling control entity and an exclusion of the calling side signaling control entity within the signaling cloud system, the media control entity is configured to establish a media data interaction path between a called side terminal device and the media exchange entity according to the media service rule.

7. A communication cloud system comprising:

a media cloud system; and a signaling cloud system;

wherein, the media cloud system comprises a media service entity, a media exchange entity, and a media control entity;

the signaling cloud system comprises a calling side signaling control entity;

the media service entity is configured to process media data to provide media service;

the media exchange entity is configured to send the media data to a terminal device or to the media service entity to exchange the media data;

the media control entity is configured to manage a media service resource of the media service entity and manage a media service rule; and the signaling cloud system is configured to receive a media service request through the calling side signaling control entity, and to control, according to the media service request, the media control entity to process a media service rule, to cause the media control entity establishes a media data interaction path between a terminal device and the media exchange entity according to the media service rule;

the calling side signaling control entity is configured to apply for a media resource and the media service rule from the media control entity, according to a service type of the media service request;

the media control entity is further configured to:

apply for a media resource from the media exchange entity based on calling side media information and a control instruction carried in the media service request, and creating the media service rule, by the media control entity; and establish a media data interaction path between a calling side terminal device and the media exchange entity according to the media service rule.

8. The system as claimed in claim 7, wherein the signaling cloud system further comprises a called side signaling control entity; the media control entity is further configured to return media resource information and a media service rule identifier to the calling side signaling control entity; the calling side signaling control entity is further configured to send the media service request, the media resource information, a media control entity identifier, and the media service rule identifier to the called side signaling control entity, to access the media control entity according to the media control entity identifier, to apply for a media resource and to modify the media service rule for a called side terminal device according to the media service request; and the media control entity is further configured to establish a media data interaction path between the called side terminal device and the media exchange entity according to the media service rule.

9. The system as claimed in claim 8, wherein establishing, by the media control entity, the media data interaction path between the called side terminal device and the media exchange entity according to the media service rule, comprises, returning, by the media control entity, media resource information allocated to the called side terminal device, to the called side signaling control entity;

sending, by the called side signaling control entity, a session request to the called side terminal device;

returning, by the called side terminal device, a session response to the called side signaling control entity, in response to the session request; and updating the media service rule according to the session response, and instructing the media control entity to execute the media service rule, by the called side signaling control entity, so as to establish the media data interaction path between the called side terminal device and the media exchange entity.

10. The system as claimed in claim 7, wherein the signaling cloud system comprises a called side signaling control entity;

the signaling cloud system receives the media service request sent by a calling side session boundary controller through the called side signaling control entity; and the signaling cloud system is configured to perform an operation of, controlling the media control entity to process the media service rule based on the media service request, to cause the media control entity to establish a media data interaction path between the terminal device and the media exchange entity according to the media service rules, the operation comprises, applying, by the called side signaling control entity, for a media resource and a media service rule from the media control entity, according to a service type of the media service request;

applying, for a media resource from the media exchange entity based on calling side media information and a control instruction carried in the media service request, and creating a media service rule, by the media control entity;

establishing, by the media control entity, a media data interaction path between the calling side session boundary controller and the media exchange entity according to the media service rule;

returning, by the media control entity, media resource information and a media service rule identifier to the called side signaling control entity; and forwarding the media service request to the called side terminal device, and controlling the media control entity to establish a media data interaction path between the called side terminal device and the media exchange entity according to the response of the called side terminal device, by the called side signaling control entity.

11. The system as claimed in claim 7, wherein the signaling cloud system is connected with the terminal device and the media cloud system respectively, the media cloud system comprises a media service entity configured to process media data, a media exchange entity configured to send the media data to the terminal device or to the media service entity, and a media control entity configured to manage a media service resource of the media service entity and to manage the media service rules; and the signaling cloud system is configured to receive a media service request; and the signaling cloud system is further configured to control, according to the media service request, the media control entity to process a media service rule, to cause the media control entity to establish a media data interaction path between the terminal device and a media exchange entity according to the media service rule.

12. The system as claimed in claim 11, wherein the signaling cloud system comprises at least one of, a calling side signaling control entity, or a called side signaling control entity; and in response to an inclusion of the calling side signaling control entity in the signaling cloud system, the signaling cloud system is configured to receive the media service request through the calling side signaling control entity, and the media control entity is configured to establish a media data interaction path between a calling side terminal device and the media exchange entity according to the media service rule; and in response to an inclusion of the called side signaling control entity and an exclusion of the calling side signaling control entity in the signaling cloud system, the signaling cloud system is configured to receive the media service request through the called side signaling control entity, and the media control entity is configured to establish a media data interaction path between a called side terminal device and the media exchange entity according to the media service rule.

13. The system as claimed in claim 7, wherein the media cloud system is connected with the signaling cloud system, and the media cloud system comprises a media service entity configured to process media data, a media exchange entity configured to send the media data to the terminal device or to the media service entity, and a media control entity configured to manage a media service resource of the media service entity and to manage the media service rules; and the media control entity is further configured to process the media service rule according to the media service request from the signaling cloud system, and establish a media data interaction path between the terminal device and the media exchange entity according to the media service rule.

14. The system as claimed in claim 13, wherein the signaling cloud system comprises at least one of, a calling side signaling control entity, or a called side signaling control entity; and in response to an inclusion of the calling side signaling control entity in the signaling cloud system, the media control entity is configured to establish a media data interaction path between a calling side terminal device and the media exchange entity according to the media service rule; and in response to an inclusion of the called side signaling control entity and an exclusion of the calling side signaling control entity within the signaling cloud system, the media control entity is configured to establish a media data interaction path between a called side terminal device and the media exchange entity according to the media service rule.

15. An operation and control device comprising at least one processor and a memory configured to be communicatively connected with the at least one processor wherein the memory stores instructions executable by the at least one processor which, when executed by the at least one processor, causes the at least one processor to carry out a method for multimedia cloud service applied to a communication cloud system, the communication cloud system comprising a signaling cloud system and a media cloud system, wherein the media cloud system comprises a media service entity configured to process media data, a media exchange entity configured to send the media data to a terminal device or to the media service entity, and a media control entity configured to manage a media service resource of the media service entity and to manage a media service rule, wherein the signaling could system comprises a calling side signaling control entity, the method comprises:
- receiving, by the signaling cloud system, a media service request through the calling side signaling control entity;
- applying, by the calling side signaling control entity, for a media resource and a media service rule from the media control entity, according to a service type of the media service request;
- applying, for a media resource from the media exchange entity based on calling side media information and a control instruction carried in the media service request, and creating a media service rule, by the media control entity; and
- establishing, by the media control entity, a media data interaction path between a calling side terminal device and the media exchange entity according to the media service rule.

16. A non-transitory computer-readable storage medium storing computer-executable instructions which, when executed by a processor, causes the processor to carry out a method for multimedia cloud service applied to a communication cloud system, the communication cloud system comprising a signaling cloud system and a media cloud system, wherein the media cloud system comprises a media service entity configured to process media data, a media exchange entity configured to send the media data to a terminal device or to the media service entity, and a media control entity configured to manage a media service resource of the media service entity and to manage a media service rule, wherein the signaling control cloud system comprises a calling side signaling control entity, the method comprises:
- receiving, by the signaling cloud system, a media service request through the calling side signaling control entity;
- applying, by the calling side signaling control entity, for a media resource and a media service rule from the media control entity, according to a service type of the media service request;
- applying, for a media resource from the media exchange entity based on calling side media information and a control instruction carried in the media service request, and creating a media service rule, by the media control entity; and
- establishing, by the media control entity, a media data interaction path between a calling side terminal device and the media exchange entity according to the media service rule.

* * * * *